(12) United States Patent
Liu et al.

(10) Patent No.: US 12,407,830 B2
(45) Date of Patent: Sep. 2, 2025

(54) VIDEO CODING USING SAMPLE STRING VECTOR

(71) Applicants: Beijing Bytedance Network Technology Co., Ltd., Beijing (CN); Bytedance Inc., Los Angeles, CA (US)

(72) Inventors: Hongbin Liu, Beijing (CN); Kai Zhang, San Diego, CA (US); Li Zhang, San Diego, CA (US); Yue Wang, Beijing (CN); Junru Li, Beijing (CN); Siwei Ma, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/303,993

(22) Filed: Apr. 20, 2023

(65) Prior Publication Data

US 2023/0262225 A1    Aug. 17, 2023

Related U.S. Application Data

(63) Continuation of application No. PCT/CN2021/124935, filed on Oct. 20, 2021.

(30) Foreign Application Priority Data

Oct. 20, 2020   (WO) ................ PCT/CN2020/122105

(51) Int. Cl.
*H04N 19/132* (2014.01)
*H04N 19/159* (2014.01)
*H04N 19/176* (2014.01)

(52) U.S. Cl.
CPC ......... *H04N 19/132* (2014.11); *H04N 19/159* (2014.11); *H04N 19/176* (2014.11)

(58) Field of Classification Search
CPC .. H04N 19/132; H04N 19/159; H04N 19/176; H04N 19/593; H04N 19/70; H04N 19/105
See application file for complete search history.

(56) References Cited

U.S. PATENT DOCUMENTS

| | | |
|---|---|---|
| 2008/0013623 A1 | 1/2008 | Wang |
| 2015/0071357 A1 | 3/2015 | Pang |

(Continued)

FOREIGN PATENT DOCUMENTS

| | | |
|---|---|---|
| CN | 104219531 A | 12/2014 |
| CN | 105898330 A | 8/2016 |

(Continued)

OTHER PUBLICATIONS

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

(Continued)

*Primary Examiner* — Tracy Y. Li
(74) *Attorney, Agent, or Firm* — Conley Rose, P.C.

(57) ABSTRACT

Methods, systems and devices for video coding using sample string vectors are described. An example method of video processing includes determining, for a conversion between a video including a current block and a bitstream of the video, an availability of a block vector of one or more non-adjacent neighboring blocks of the current block for a prediction of a block vector of the current block according to a rule, and performing, based on the determining, the conversion, wherein the rule specifies a pre-defined order for checking the one or more non-adjacent neighboring blocks.

17 Claims, 14 Drawing Sheets

(56) References Cited

U.S. PATENT DOCUMENTS

| | | | |
|---|---|---|---|
| 2015/0229971 | A1 | 8/2015 | Ye |
| 2015/0373358 | A1 | 12/2015 | Pang |
| 2016/0286241 | A1 | 9/2016 | Ridge et al. |
| 2017/0155914 | A1 | 6/2017 | Jeon |
| 2018/0359483 | A1 | 12/2018 | Chen |
| 2019/0174145 | A1 | 6/2019 | Zhang |
| 2019/0246118 | A1* | 8/2019 | Ye .................. H04N 19/176 |
| 2020/0045328 | A1 | 2/2020 | Ye |
| 2020/0053379 | A1 | 2/2020 | Han |
| 2020/0059659 | A1 | 2/2020 | Chen |
| 2020/0077084 | A1 | 3/2020 | Li |
| 2020/0084468 | A1 | 3/2020 | Chien |
| 2020/0413084 | A1 | 12/2020 | Xu et al. |
| 2021/0092432 | A1* | 3/2021 | Rusanovskyy ........ H04N 19/56 |
| 2021/0250606 | A1* | 8/2021 | Choi .................. H04N 19/52 |
| 2021/0266538 | A1 | 8/2021 | Gao |
| 2021/0337196 | A1* | 10/2021 | Lee .................. H04N 19/54 |
| 2022/0417550 | A1* | 12/2022 | Wang .................. H04N 19/11 |
| 2023/0016630 | A1* | 1/2023 | Hu .................. H04N 19/52 |

FOREIGN PATENT DOCUMENTS

| | | | |
|---|---|---|---|
| CN | 105917648 | A | 8/2016 |
| CN | 106797473 | A | 5/2017 |
| CN | 110677650 | A | 1/2020 |
| CN | 110730348 | A | 1/2020 |
| CN | 110855998 | A | 2/2020 |
| CN | 111131822 | A | 5/2020 |
| CN | 111541896 | A | 8/2020 |
| EP | 3253061 | A1 | 12/2017 |
| JP | 2014204356 | A | 10/2014 |
| TW | 201526617 | A | 7/2015 |
| WO | 2020004978 | A1 | 1/2020 |
| WO | 2020048366 | A1 | 3/2020 |

OTHER PUBLICATIONS

Suehring, K., Retrieved from the internet: https://vcgit.hhi.fraunhofer.de/jvet/VVCSoftware_VTM/tags/VTM-9.0, Feb. 27, 2023, 2 pages.
"Series H: Audiovisual and Multimedia Systems Infrastructure of audiovisual services—Coding of moving video High efficiency video coding," ITU-T and ISO/IEC, Rec. ITU-T H.265 | ISO/IEC 23008-2, Feb. 2018, 692 pages.
Retrieved from the internet: https://jvet.hhi.fraunhofer.de/svn/svn_HMJEMSoftware/, Feb. 27, 2023, 1 page.
Document: JVET-L0399, Han, Y., et al., "CE4.4.6: Improvement on Merge/Skip mode," Joint Video Exploration Team (JVET) of ITU-T SG 16 WP 3 and ISO/IEC JTC 1/SC 29/WG 11 12th Meeting: Macao, CN, Oct. 3-12, 2018, 6 pages.
Document: JVET-N0329, Xiu, X., et al., "CE8-related: Encoder improvements on IBC search," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-K0339, Han, Y., et al., "CE4.2.3: Improvement on Merge/Skip mode," Joint Video Exploration Team (JVET) of ITU-T SG 16 WP 3 and ISO/IEC JTC 1/SC 29/WG 11 11th Meeting: Ljubljana, SI, Jul. 10-18, 2018, 7 pages.
Document: JVET-L0323-v1, Gao, M., et al., "CE4.4.2: Long distance merge candidates," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JCTVC-W1014, Joshi, R., et al., "Screen content coding test model 7 (SCM 7)," Joint Collaborative Team on Video Coding (JCT-VC) of ITU-T SG 16 WP 3 and ISO/IEC JTC 1/SC 29/WG 11 23rd Meeting: San Diego, USA, Feb. 19-26, 2016, 14 pages.
Document: JVET-J0021, Chen, Y., et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WG 11 10th Meeting: San Diego, US, Apr. 10-20, 2018, 44 pages.
Document: JVET-L1002-v1, Chen, J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11 12th Meeting: Macao, CN, Oct. 3-12, 2018, 40 pages.
Document: JVET-M0544-v1, Xu, X., et al., "Non-CE8: CPR with chroma 4×4 sub-block size when dual-tree is on," Joint Video Experts Team (JVET) of ITU-T SG 16 WP 3 and ISO/IEC JTC 1/SC 29/WG 11 13th Meeting: Marrakesh, MA, Jan. 9-18, 2019, 5 pages.
Document: JCTVC-I0272, Zhang, P., et al., "4:4:4 Screen Content Coding using Dual-coder Mixed Chroma-sampling-rate (DMC) Techniques," Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, 11 pages.
Foreign Communication From a Related Counterpart Application, PCT Application No. PCT/CN2021/098526, International Search Report dated Sep. 9, 2021, 9 pages.
Foreign Communication From a Related Counterpart Application, PCT Application No. PCT/CN2021/098764, International Search Report dated Sep. 7, 2021, 11 pages.
Foreign Communication From a Related Counterpart Application, PCT Application No. PCT/CN2021/113427, International Search Report dated Nov. 17, 2021, 12 pages.
Foreign Communication From a Related Counterpart Application, PCT Application No. PCT/CN2021/124935, International Search Report dated Dec. 29, 2021, 10 pages.
Foreign Communication From a Related Counterpart Application, PCT Application No. PCT/CN2021/125249, International Search Report dated Jan. 18, 2022, 12 pages.
Non-Final Office Action from U.S. Appl. No. 18/074,898 dated May 3, 2024, 17 pages.
Non-Final Office Action from U.S. Appl. No. 18/077,783 dated May 9, 2024, 21 pages.
Non-Final Office Action from U.S. Appl. No. 18/304,631 dated Sep. 19, 2024, 20 pages.
Non-Final Office Action from U.S. Appl. No. 18/077,783 dated Nov. 8, 2024, 17 pages.

* cited by examiner

US 12,407,830 B2

VIDEO CODING USING SAMPLE STRING VECTOR

CROSS-REFERENCE TO RELATED APPLICATION

This application is a continuation of International Patent Application No. PCT/CN2021/124935, filed on Oct. 20, 2021, which claims the priority to and benefits of International Patent Application No. PCT/CN2020/122105 filed Oct. 20, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques for video coding using sample string vectors that can be used by image and video encoders and decoders to perform image or video encoding, decoding, or processing.

In one example aspect, a video processing method is disclosed. The method includes determining, for a conversion between a video comprising a current block and a bitstream of the video, an availability of a block vector of one or more non-adjacent neighboring blocks of the current block for a prediction of a block vector of the current block according to a rule, and performing, based on the determining, the conversion, wherein the rule specifies a pre-defined order for checking the one or more non-adjacent neighboring blocks.

In another example aspect, a video processing method is disclosed. The method includes determining, for a conversion between a video comprising a current block and a bitstream of the video, whether and how to store a sample string vector associated with a first sample string of the current block, and performing, based on the determining, the conversion, wherein the determining is based on a length, a position, or a shape of the first sample string.

In yet another example aspect, a video processing method is disclosed. The method includes determining, for a conversion between a video comprising a current block and a bitstream of the video, whether and how to insert a sample string vector associated with a first sample string of a reference block into a first list comprising previously coded or decoded block vectors or sample string vectors, and performing, based on the determining, the conversion, wherein the determining is based on a length, a position, or a shape of the first sample string, a size of the current block, or a size of the reference block.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Figure 1:
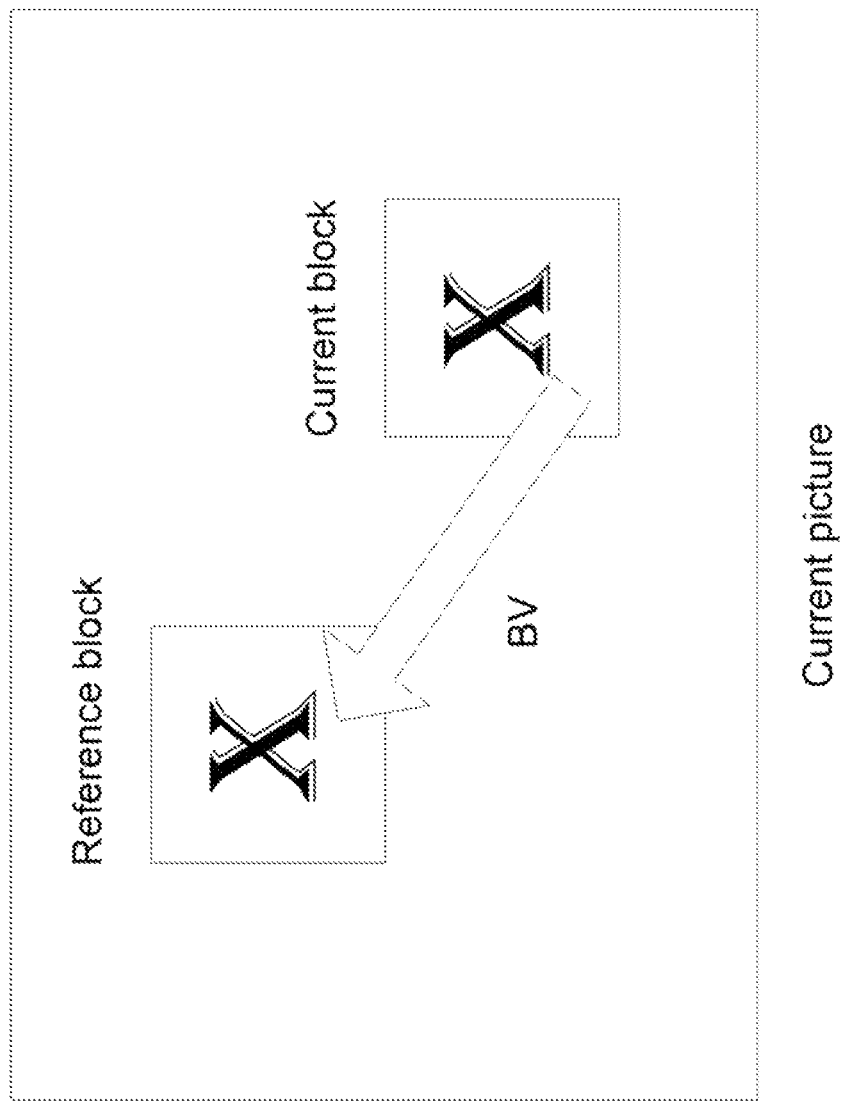
FIG. 1 shows an example of intra block copy (IBC).

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1 Introduction

The techniques described in this document may be used for encoding and decoding visual media data such as images or a video, generally called video in the present document. Specifically, it is related to intra block copy in video coding. It may be applied to the existing video coding standard like HEVC, or the standard (Versatile Video Coding, Audio Video Standard 3) to be finalized. It may be also applicable to future video coding standards or video codec.

2 Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 9) could be found at:

http://phenix.it-sudparis.eu/jvet/doc_end_user/documents/18_Alpbach/wg11/JVET-R2001-v10.zip The latest reference software of VVC, named VTM, could be found at:

https://vcgit.hhi.fraunhofer.de/jvet/VVCSoftware_VTM/tags/VTM-9.0

2.1 History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:
1) Number of HMPV candidates is used for merge list generation is set as (N<=4)? M:(8−N), wherein N indicates number of existing candidates in the merge list and M indicates number of available HMVP candidates in the table.
2) Once the total number of available merge candidates reaches the maximally allowed merge candidates minus 1, the merge candidate list construction process from HMVP is terminated.

The idea of HMVP is also extended to block vector prediction in Intra Block Copy (mode).

2.2 Intra Block Copy

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As depicted in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX}=(\text{ChromaArrayType}==0)?0:(\text{mvCLX}[0]\&0\times 7??:0) \quad (8\text{-}104)$$

$$\text{offsetY}=(\text{ChromaArrayType}==0)?0:(\text{mvCLX}[1]\& 0\times 7??:0) \quad (8\text{-}105)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both the following conditions shall be true:
The value of (mvLX[0]>>2)+nPbW+xB1+offsetX is less than or equal to 0.

The value of (mvLX[1]>>2)+nPbH+yB1+offsetY is less than or equal to 0.
The following condition shall be true:

$$(xPb+(mvLX[0]>>2)+nPbSw-1+offsetX)/CtbSizeY-xCurr/CtbSizeY<=yCurr/CtbSizeY-(yPb+(mvLX[1]>>2)+nPbSh-1+offsetY)/CtbSizeY \quad (8\text{-}106)$$

Thus, the case that the reference block overlaps with the current block or the reference block is outside of the picture will not happen. There is no need to pad the reference or prediction block.

2.4 IBC in VVC Test Model

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.4.1 IBC Merge Mode

Figure 2:
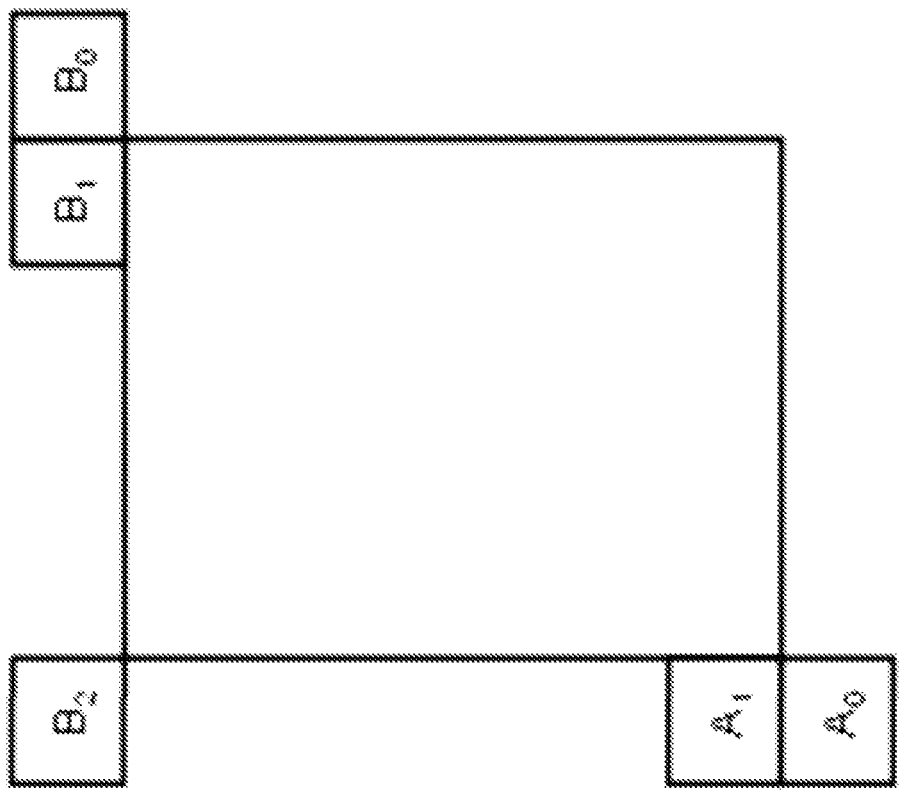
FIG. 2 shows example positions of spatial merge candidates.

In IBC merge mode, an index pointing to an entry in the IBC merge candidates list is parsed from the bitstream. The construction of the IBC merge list can be summarized according to the following sequence of steps:
Step 1: Derivation of spatial candidates
Step 2: Insertion of HBVP (History-based Block Vector Prediction) candidates
Step 3: Insertion of pairwise average candidates In the derivation of spatial merge candidates, a maximum of four merge candidates are selected among candidates located in the positions depicted in FIG. 2. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

After insertion of the spatial candidates, if the IBC merge list size is still smaller than the maximum IBC merge list size, IBC candidates from HBVP table may be inserted. Redundancy check are performed when inserting the HBVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.4.2 IBC AMVP Mode

In IBC AMVP (Advanced Motion Vector Prediction) mode, an AMVP index point to an entry in the IBC AMVP list is parsed from the bitstream. The construction of the IBC AMVP list can be summarized according to the following sequence of steps:
Step 1: Derivation of spatial candidates
Check $A_0, A_1$ until an available candidate is found.
Check $B_0, B_1, B_2$ until an available candidate is found.
Step 2: Insertion of HBVP candidates.
Step 3: Insertion of zero candidates.

After insertion of the spatial candidates, if the IBC AMVP list size is still smaller than the maximum IBC AMVP list size, IBC candidates from HBVP table may be inserted.

Finally, zero candidates are inserted into the IBC AMVP list.

2.5 IBC AMVP Mode in AVS3

In AVS3 (Audio Video coding Standard 3), a HBVP list is maintained to store BVs of previously coded blocks. For each entry of the HBVP list, besides a BV, information of the block associated with the BV, including width and height of the block and the coordinates of the top-left sample of the block (relative to the top-left sample of the picture), is also stored. Meanwhile, a counter indicating how many times the BV is encountered is also stored in the entry. Hereinafter, coordinate of the top-left sample of the block is also used as the coordinates of the block.

In the IBC AMVP mode, when constructing the IBC AMVP (Advanced Motion Vector Prediction) list for a current block, first, BVs in the HBVP list are checked in order and classified into 7 classes. Each class can contain at most one BV, if more than one BVs are classified into one same class, the latest checked one is used for the class.

For a BV, if the size (e.g., width*height) of the block associated with the BV is greater than or equal to 64, it is placed into the $0^{th}$ class.

For a BV, if its counter is greater than or equal to 3, it is placed into the $1^{st}$ class.

For a BV, it is further classified in the following order:
if its horizontal coordinator is less than the horizontal coordinator of the current block and its vertical coordinator is less than the vertical coordinator of the current block, it is placed into the $4^{th}$ class, e.g. the above-left class.
else if its horizontal coordinate is greater than or equal to the horizontal coordinate of the current block plus the width of the current block, it is placed into the $5^{th}$ class, e.g., the above-right class.
else if its vertical coordinate is greater than or equal to the vertical coordinate of the current block plus the height of the current block, it is placed into the $6^{th}$ class, e.g., the below-left class.
else if its vertical coordinate is less than the vertical coordinate of the current block, it is placed into the $3^{rd}$ class, e.g., the above class.
else if its horizontal coordinate is less than the horizontal coordinate of the current block, it is placed into the $2^{nd}$ class, e.g., the left class.

Second, BVs of classes 0-6 are inserted into the AMVP list in order. If a class is not empty, the corresponding BV may be added to the AMVP list after pruned with already inserted AMVP candidates.

In the BV estimation process, an initial BV is first determined. Then, one-dimensional vertical BV search, one-dimensional horizontal BV search and two-dimensional BV search are performed successively to find the best BV. Each BV search stage starts from the same initial BV. In the one-dimensional vertical BV search, the vertical BV component is constrained to be less than or equal to y−H. Similarly, in the one-dimensional horizontal BV search, the horizontal BV component is constrained to be less than or equal to x−W.

2.6 Sample String Prediction in AVS3

Figure 5:
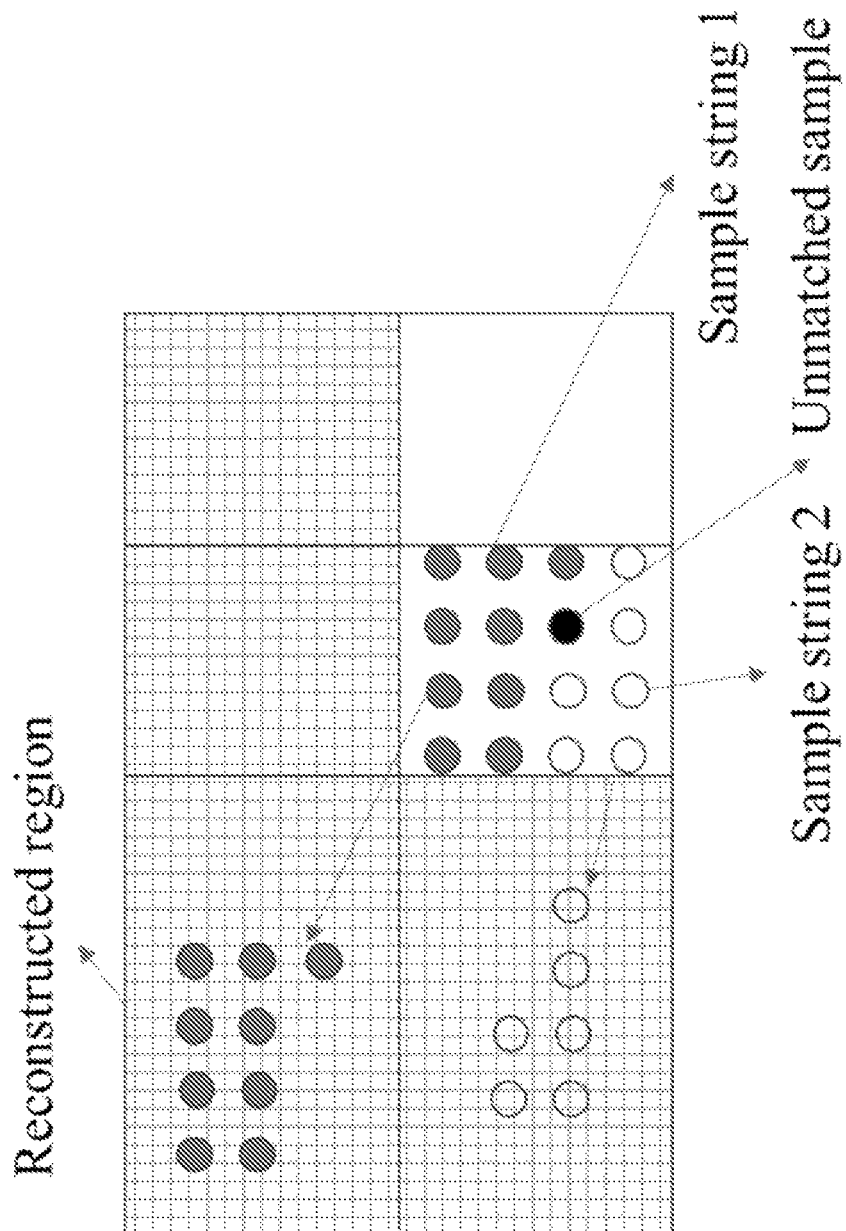
FIG. 5 shows an example of sample string prediction.

In M4503, a sample string prediction method is proposed, wherein a current video block is split into one or multiple groups of samples (e.g., a group of samples is called a sample string) and each sample string is predicted by copying a group of pixels in the current picture that includes the current video block. Meanwhile, a sample may not be predicted and may be encoded directly, such sample is called unmatched sample. An example is shown in FIG. 5, wherein a CU is split into two sample strings and each string is predicted by a group of pixels identified by a sample string vector (SV). No residual is coded for a CU coded in sample string prediction mode. The sample strings are scanned in traverse order, and for each sample string, a string length and a string vector are encoded. For unmatched samples, their values are coded directly.

SV of a sample string may be directly from an intra history motion vector prediction list which is updated by history BVs and SVs. When SV of a sample string is predicted from the intra history motion vector prediction list, no SV difference is further signaled.

In sample string prediction method, SVs of a block is not used for predicting its following coded blocks.

3 Technical Problems Solved by Disclosed Technical Solutions

1. Block vector (BV) of non-adjacent neighboring blocks are not used when constructing the IBC merge list or AMVP list, which is inefficient.
2. In AVS3, when classifying a BV from the HBVP list, the block size (e.g., width*height of a block) associated with the BV is compared with a fixed value (e.g., 64) to decide whether the BV shall be classified into the $0^{th}$ class, regardless the size of the current block, which may be unreasonable.
3. In AVS3, in the one-dimensional BV search stage, a very strict constraint is applied to the vertical BV component and the horizontal BV component, which is inefficient.
4. In string sample prediction method, SV are not used for predicting following blocks, which is inefficient.
5. Syntax elements related to SV and BV are designed differently.
6. SV prediction list and BV prediction list are constructed in different ways.

4 Example Solutions and Embodiments

The items below should be considered as examples to explain general concepts. These items should not be interpreted in a narrow way. Furthermore, these items can be combined in any manner.

Denote coordinate of the current block (e.g., coordinate of the top-left sample of the block) as (x, y) and denote width and height of the current block as W and H, respectively. Denote coordinate of a non-adjacent neighboring sample as (x−deltaX, y−deltaY), wherein deltaX and deltaY are positive integers, negative integers or 0, and a non-adjacent neighboring block is the S1*S2 (S1 and Se are integers, e.g., S1=S2=4) block covering the sample. Assume that the current CTU row which contains the current block starts from coordinate (0, ctuRowY). In AVS3, an intra history motion vector prediction list is maintained, and the list is updated by history BVs and SVs. The intra history motion vector prediction list may be used for BV and SV coding.

Figure 3:
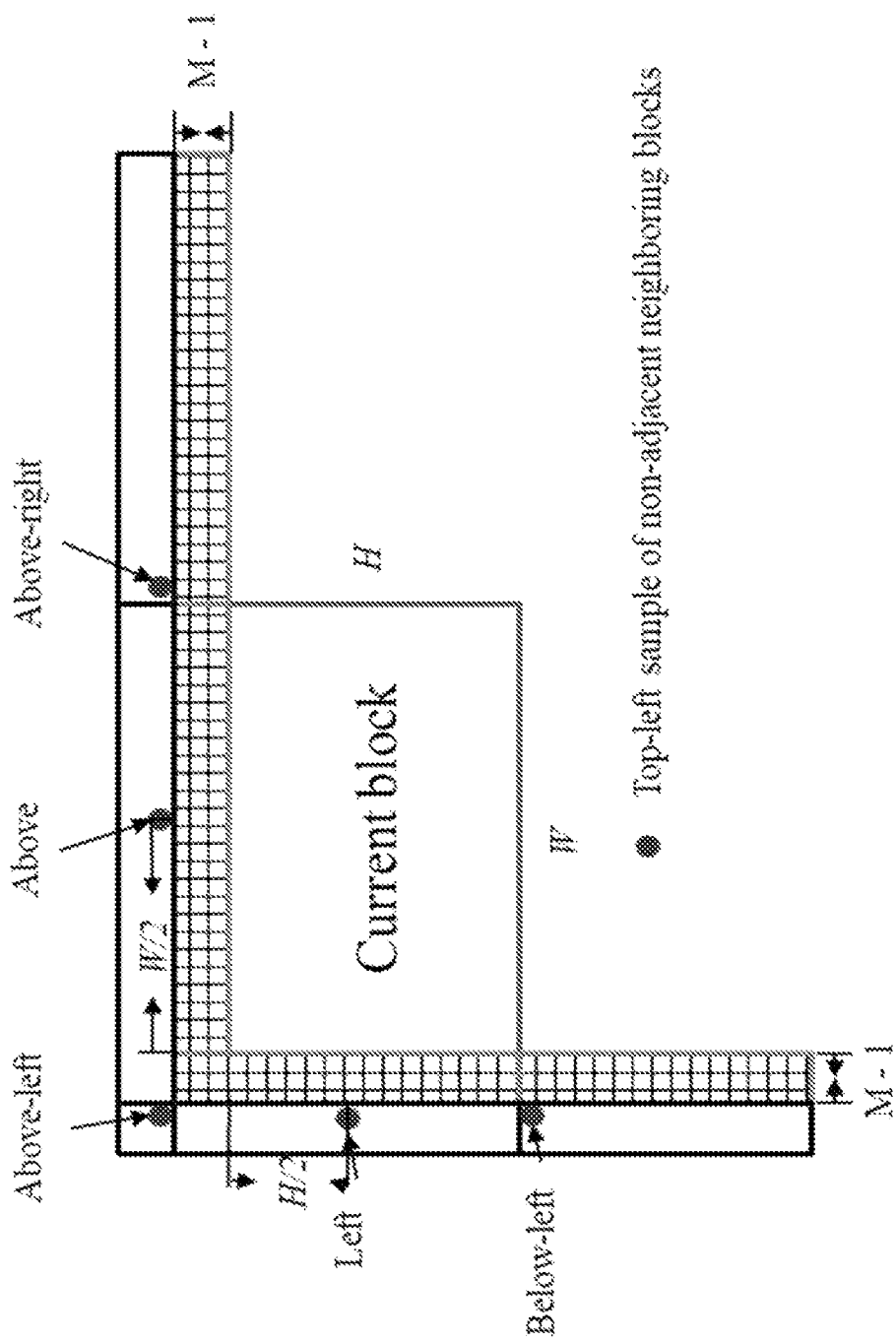
FIG. 3 shows an example of non-adjacent neighboring blocks.
Figure 4:
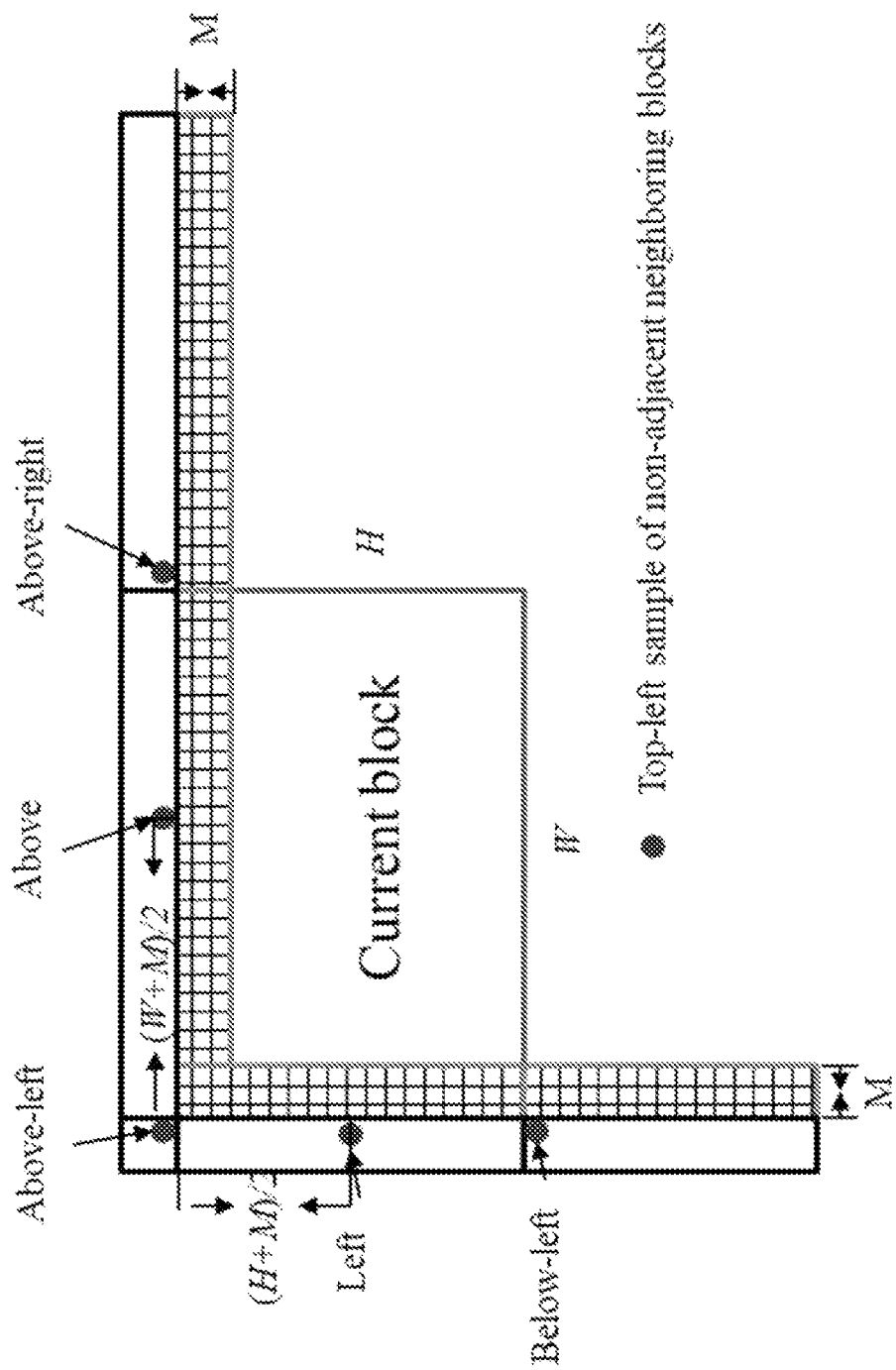
FIG. 4 shows another example of non-adjacent neighboring blocks.
Figure 6:
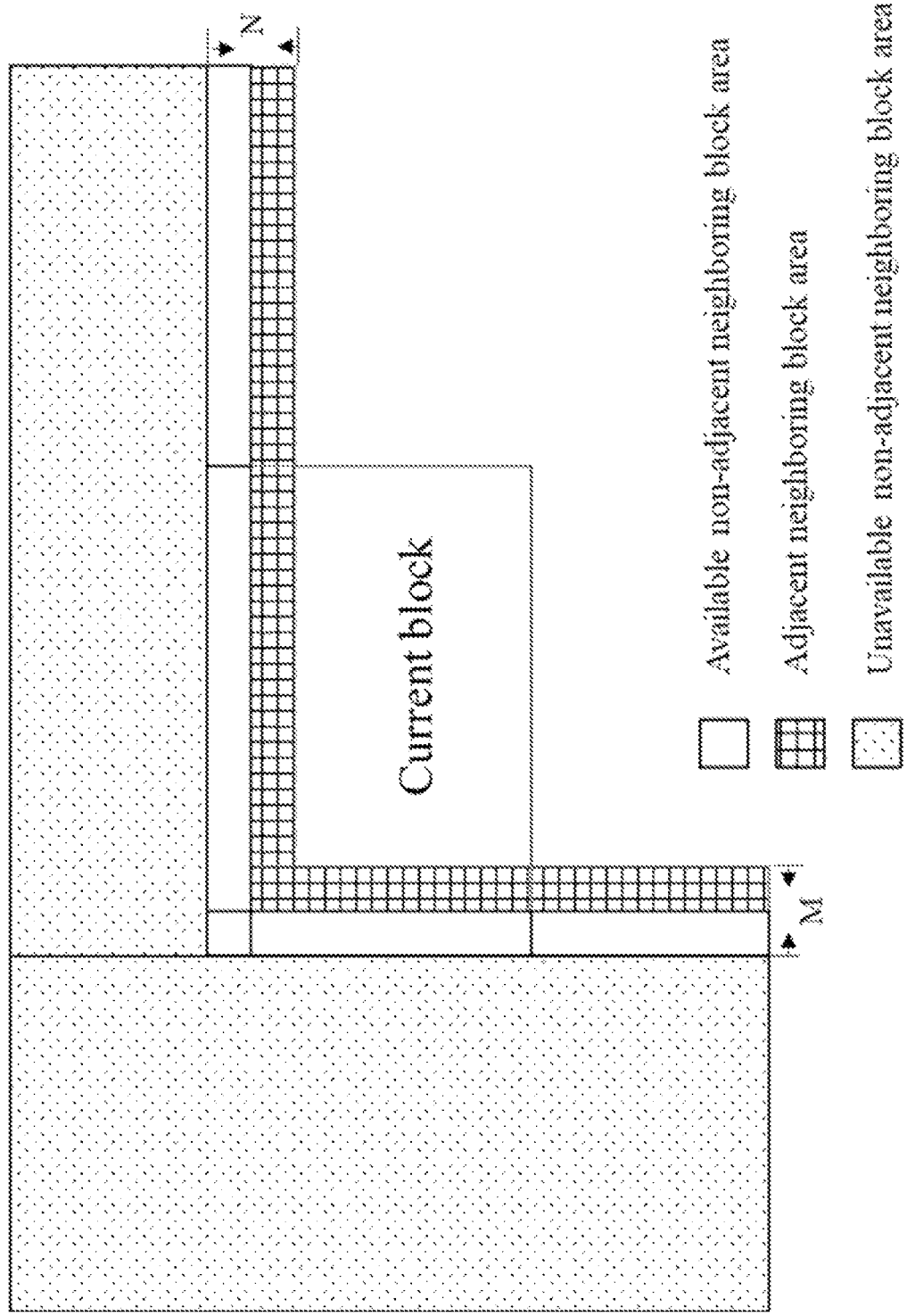
FIG. 6 shows an example of an available non-adjacent neighboring block area.

1. It is proposed that when predicting a BV of a current block, BVs of its non-adjacent neighboring blocks may be used.
    a. It is proposed that BVs of non-adjacent neighboring blocks may be inserted into the IBC merge list or/and the IBC AMVP list (e.g., block vector prediction list).
    b. In one example, positions of non-adjacent neighboring blocks may depend on width or/and height of the current block.
        i. For example, non-adjacent neighboring blocks covering positions (x−M, y−M), (x−M, y+H/2), (x−M, y+H), (x+W/2, y−M), (x+W, y−M) may be checked when constructing the IBC merge list or/and the IBC AMVP list, wherein M is an integer, as illustrated in FIG. 3. For example, M=8.
            1. Alternatively, non-adjacent neighboring blocks covering positions (x−M, y−M), (x−M, y+H−1), (x−M, y+H), (x+W−1, y−M), (x+W, y−M) may be checked when constructing the IBC merge list or/and the IBC AMVP list.
            2. Alternatively, furthermore, non-adjacent neighboring blocks covering positions (x−M, y), (x, y−M), (x−M, y+3*H/2), (x−M, y+2*H), (x+3*W/2, y−M), (x+2*W, y−M) may be checked when constructing the IBC merge list or/and the IBC AMVP list.
        ii. For example, non-adjacent neighboring blocks covering positions (x−M−1, y−M−1), (x−M−1, y−M−1+(H+M)/2), (x−M−1, y+H), (x−M−1+(W+M)/2, y−M−1), (x+W, y−M−1) may be checked when constructing the IBC merge list or/and the IBC AMVP list, wherein M is an integer, as illustrated in FIG. 4. For example, M=8.
            1. Alternatively, non-adjacent neighboring blocks covering positions (x−M−1, y−M−1), (x−M−1, y+H−1), (x−M−1, y+H), (x+W−1, y−M−1), (x+W, y−M−1) may be checked when constructing the IBC merge list or/and the IBC AMVP list.
            2. Alternatively, furthermore, non-adjacent neighboring blocks covering positions (x−M−1, y), (x, y−M−1), (x−M−1, y−M−1+3*(H+M)/2), (x−M−1, y+2*H+M), (x−M−1+3*(W+M)/2, y−M−1), (x+2*W+M, y−M−1) may be checked when constructing the IBC merge list or/and the IBC AMVP list.
    c. In one example, the non-adjacent neighboring blocks may be located in a picture different from the current picture which contains the current block.
        i. In one example, the picture where the non-adjacent neighboring block is from is a reference picture of current block.
        ii. In one example, all the non-adjacent neighboring blocks may be from the different picture.
        iii. Alternatively, partial of the non-adjacent neighboring blocks may be from the different picture and remaining may be from the current picture.
    d. In one example, non-adjacent neighboring blocks may be checked in a pre-defined order.

i. Alternatively, the order may be dependent on the decoded information.
e. In one example, how many non-adjacent neighboring blocks are checked may depend on the shape or dimension of the current block.
f. In one example, how many non-adjacent neighboring blocks are checked may depend on the coordinate of the current block.
g. In one example, when a non-adjacent neighboring block and the current block are in two different CTU rows, BV of the non-adjacent neighboring block may not be used for predicting BV of the current block.
h. In one example, when a non-adjacent neighboring block and the current block are in two different CTU rows, and the difference between vertical coordinate of the current block and vertical coordinate of the current CTU row (e.g., ctuRowY) is less than or equal to Th, BV of the non-adjacent neighboring block may not be used for predicting BV of the current block.
  i. For example, Th is equal to 0. In this case, the current block is on the top row of the current CTU row.
  ii. For example, Th is equal to 4.
  iii. For example, Th is equal to M−4, wherein M is defined above for indicating positions of non-adjacent neighboring blocks.
i. In one example, when a non-adjacent neighboring block and the current block are in two different CTU rows, position of the non-adjacent neighboring block may be clipped to be within the same CTU row with the current block, and BV at the clipped position may be used for predicting BV of the current block.
j. In one example, when a non-adjacent neighboring block and the current block are in two different CTU rows, vertical position of the non-adjacent neighboring block may be clipped to be within a distance to the vertical coordinate of the current CTU row, and BV at the clipped position may be used for predicting BV of the current block.
  i. For example, vertical position of the non-adjacent neighboring block may be clipped to ctuRowY−Th2, wherein Th2 is an integer. For example, Th2 is equal to 0, 4 or 8.
k. In one example, when a non-adjacent neighboring block and the current block are in two different tiles/slices/sub-pictures, BV of the non-adjacent neighboring block may not be used for predicting BV of the current block.
  i. Alternatively, position of the non-adjacent neighboring block may be clipped to be within the same tile/slice/sub-picture with the current block and BV at the clipped position may be used for predicting BV of the current block.
l. In one example, when a non-adjacent neighboring block and the current block are in two different CTUs or regions (e.g., rectangular region with width RW and height RH), BV of the non-adjacent neighboring block may not be used for predicting BV of the current block.
  i. Alternatively, position of the non-adjacent neighboring block may be clipped to be within the same CTU with the current block, and BV at the clipped position may be used for predicting BV of the current block.
m. In one example, when a non-adjacent neighboring block is out of the above N (e.g., N=8) neighboring rows of the current block, BV of the block may not be used for predicting the current block. An example is shown in FIG. 6, only BVs of non-adjacent neighboring blocks in the "available non-adjacent neighboring block area" may be used for predicting BV of the current block.
n. In one example, when a non-adjacent neighboring block is out of the left M (e.g., M=8) neighboring columns of the current block, BV of the block may not be used for predicting BV of the current block. An example is shown in FIG. 6.
o. In one example, when a non-adjacent neighboring block is out of a L shape neighboring area of the current block, BV of the block may not be used for predicting BV of the current block.
p. In one example, when a reference block of a current block identified by a BV of a non-adjacent neighboring block is not fully included in the current CTU or the current region (e.g., rectangular region with width RW and height RH) that includes the current block, such BV may not be used for predicting BV of the current block.

2. It is proposed that checking order of the non-adjacent neighboring blocks may depend on the relative positions of the neighboring blocks to the current block.
  a. In one example, checking order of the non-adjacent neighboring blocks may be as follows: above-left neighboring block, above-right neighboring block, below-left neighboring block, above neighboring block, and the left neighboring block of the current block.
    i. For example, non-adjacent neighboring blocks covering positions (x−M, y−M), (x−M, y+H/2), (x−M, y+H), (x+W/2, y−M), (x+W, y−M) are checked in the order of: (x−M, y−M), (x+W, y−M), (x−M, y+H), (x+W/2, y−M), (x−M, y+H/2).
    ii. For example, non-adjacent neighboring blocks covering positions (x−M−1, y−M−1), (x−M−1, y−M+(H+M)/2), (x−M−1, y+H), (x−M+(W+M)/2, y−M−1), (x+W, y−M−1) are checked in the order of: (x−M−1, y−M−1), (x+W, y−M−1), (x−M−1, y+H), (x−M+(W+M)/2, y−M−1), (x−M−1, y−M+(H+M)/2).
  b. In one example, checking order of the non-adjacent neighboring blocks may be as follows: left neighboring block, above neighboring block, above-left neighboring block, above-right neighboring block and below-left neighboring block of the current block.
    i. For example, non-adjacent neighboring blocks covering positions (x−M, y−M), (x−M, y+H/2), (x−M, y+H), (x+W/2, y−M), (x+W, y−M) are checked in the order of: (x−M, y+H/2), (x+W/2, y−M), (x−M, y−M), (x+W, y−M), (x−M, y+H).
    ii. For example, non-adjacent neighboring blocks covering positions (x−M−1, y−M−1), (x−M−1, y−M+(H+M)/2), (x−M−1, y+H), (x−M+(W+M)/2, y−M−1), (x+W, y−M−1) are checked in the order of: (x−M−1, y−M+(H+M)/2), (x−M+(W+M)/2, y−M−1), (x−M−1, y−M−1), (x+W, y−M−1), (x−M−1, y+H).
  c. In one example, checking order of the non-adjacent neighboring blocks may be as follows: left neighboring block, above neighboring block, above-right neighboring block, below-left neighboring block, and the above-left neighboring block of the current block.
  d. In one example, checking order of the non-adjacent neighboring blocks may be as follows: below-left neighboring block, left neighboring block, above-right neighboring block, above neighboring block, and the above-left neighboring block of the current block.
  e. In one example, checking order of the non-adjacent neighboring blocks may be as follows: above-left neighboring block, left neighboring block, above neighboring block, above-right neighboring block and below-left neighboring block of the current block.
  f. In one example, checking order of the non-adjacent neighboring blocks may be as follows: above-left neighboring block, above neighboring block, left neighboring block, above-right neighboring block and below-left neighboring block of the current block.
  g. In one example, checking order of the non-adjacent neighboring blocks may be as follows: above neighboring block, left neighboring block, above-left neighboring block, above-right neighboring block and below-left neighboring block of the current block.
  h. In one example, the non-adjacent neighboring blocks may be classified into multiple groups, candidates in each group are checked in a predefined order and at most N (N is an integer, e.g., N=1) candidates from one group may be inserted into the IBC merge list or/and IBC AMVP list.
    i. For example, the non-adjacent neighboring blocks may be classified into two groups: {below-left, left}-neighboring blocks, {above-right, above, above-left}-neighboring blocks.
    ii. For example, the non-adjacent neighboring blocks may be classified into two groups: {below-left, left, above-left}-neighboring blocks, {above-right, above}-neighboring blocks.
  i. In one example, checking order of the non-adjacent neighboring blocks may depend on the distance from the neighboring block to the current block.
    i. For example, the distance may be defined as the distance from the top-left sample of the neighboring block to the top-left sample of the current block.
      1. The distance may be defined as the sum of the horizontal distance and the vertical distance from the top-left sample of the neighboring block to the top-left sample of the current block.
      2. The distance may be defined as sum of the squared horizontal distance and the squared vertical distance from the top-left sample of the neighboring block to the top-left sample of the current block.
    ii. For example, the non-adjacent neighboring blocks may be checked in ascending distance order.
    iii. For example, the non-adjacent neighboring blocks may be checked in descending distance order.
  j. In one example, checking order of the non-adjacent neighboring blocks may depend on the dimension or shape of the current block.
    i. For example, for a block with W>M1*H(e.g., M1=2), above, above-right, and above-left neighboring blocks may be given a higher priority than the below-left and left neighboring blocks.
    ii. For example, for a block with W>M1*H(e.g., M1=2), above, above-right, and above-left neighboring blocks may be given a lower priority than the below-left and left neighboring blocks.
    iii. For example, for a block with H>M3*W(e.g., M1=2), above, above-right, and above-left neighboring blocks may be given a higher priority than the below-left and left neighboring blocks.
    iv. For example, for a block with H>M1*W(e.g., M1=2), above, above-right, and above-left neighboring blocks may be given a lower priority than the below-left and left neighboring blocks.
  k. In one example, checking order of the non-adjacent neighboring blocks may depend on the dimension of the neighboring blocks.
    i. For example, the non-adjacent neighboring blocks may be checked in ascending size (width*height) order.
    ii. For example, the non-adjacent neighboring blocks may be checked in descending size (width*height) order.
3. It is proposed that insertion of BVs of the non-adjacent neighboring blocks into the IBC merge list or/and IBC AMVP list may depend on the availability of BVs from the HBVP list or/and availability of BVs of the adjacent neighboring blocks.
  a. In one example, BVs of the non-adjacent neighboring blocks are inserted after BVs from the HBVP list.
    i. Alternatively, BVs of the non-adjacent neighboring blocks are inserted before BVs from the HBVP list.
    ii. Alternatively, BVs of the non-adjacent neighboring blocks are interleaved with BVs from the HBVP list.
  b. In one example, BVs of the non-adjacent neighboring blocks are inserted after BVs of the adjacent neighboring blocks.
    i. Alternatively, BVs of the non-adjacent neighboring blocks are inserted before BVs of the adjacent neighboring blocks.
    ii. Alternatively, BVs of the non-adjacent neighboring blocks are interleaved with BVs of the adjacent neighboring blocks.
  c. In one example, no BVs of the non-adjacent neighboring blocks are inserted when there are no empty entries in the IBC merge/AMVP list after inserting BVs from the HBVP list or/and BVs of the adjacent neighboring blocks.
  d. In one example, BVs of the non-adjacent neighboring blocks may be classified into multiple classes in a similar way with BVs from the HBVP list.
    i. For example, non-adjacent neighboring blocks may be classified into 5 classes according to the relative positions of the neighboring blocks to the current block, including the above-left class, above-right class, below-left class, above class and left class. One or multiple non-adjacent neighboring blocks may be classified into one class.
    ii. In one example, when the HBVP list does not contain any available BV in a first class, BV of a non-adjacent neighboring block belonging to the first class (if available) may be used instead.
      1. In one example, BVs of one or multiple non-adjacent neighboring blocks belonging to the first class may be checked in a predefined order until an available BV is found or all BVs are checked.
  2. BVs of one or multiple non-adjacent neighboring blocks belonging to the first class may be checked in a predefined order until an BV in the first class is inserted into the IBC merge/AMVP list or all BVs are checked.
 iii. In one example, when there are available BVs from both the HBVP list and the non-adjacent neighboring blocks for a first class, which BV is used may depend on the distances (similar as defined in bullet 2.e) from the blocks associated with the BVs to the current block.
  1. For example, BVs may be checked in descending distance order until an available BV is found, or all BVs are checked.
  2. For example, BVs may be checked in descending distance order until an BV is inserted into the IBC merge/AMVP list or all BVs are checked.
  3. For example, BVs may be checked in ascending distance order until an available BV is found, or all BVs are checked.
  4. For example, BVs may be checked in ascending distance order until an BV is inserted into the IBC merge/AMVP list or all BVs are checked.
e. In one example, when the HBVP list does not contain any available BV in a first class (e.g., the first class may be one of the $0^{th}$, $1^{st}$, $2^{nd}$, $3^{rd}$, $4^{th}$, $5^{th}$ or $6^{th}$ class), BVs of a non-adjacent neighboring block may be used for the first class.
 i. In one example, when the HBVP list does not contain any available BV in a first class, BVs of a first set of non-adjacent neighboring blocks may be checked in order until an available BV is found, or all BVs are checked.
 ii. In one example, when the HBVP list does not contain any available BV in a second class, BVs of a second set of non-adjacent neighboring blocks may be checked in order until an available BV is found. The first set of non-adjacent neighboring blocks may be different from the second set of non-adjacent neighboring blocks when the first class is different from the second class.
  1. Alternatively, the first set of non-adjacent neighboring blocks may be same with the second set of non-adjacent neighboring blocks.
 iii. In one example, if a non-adjacent neighboring block belongs to a first non-adjacent neighboring block set, it may not belong to a second non-adjacent neighboring block set which is different from the first non-adjacent neighboring block set.
 iv. In one example, when BV of a first non-adjacent neighboring block is used for a first class, it may not be checked again for a second class.
  1. Alternatively, when BV of a first non-adjacent neighboring block is checked for a first class, it may not be checked again for a second class.
f. In one example, before insertion of a BV from a non-adjacent neighboring block, the BV may be compared to one or multiple BVs that are already inserted into the IBC merge/AMVP list.
 i. In one example, if a BV from a non-adjacent neighboring block is identical to one of the one or multiple BVs that are already inserted into the IBC merge/AMVP list, it is not inserted into the IBC merge/AMVP list.
 ii. In one example, if a BV from a non-adjacent neighboring block is similar to one of the one or multiple BVs that are already inserted into the IBC merge/AMVP list, it is not inserted into the IBC merge/AMVP list.
 iii. In one example, such comparison may be performed for one or multiple BVs from the non-adjacent neighboring blocks.
 iv. Alternatively, no comparison is performed.
4. It is proposed that whether a BV from the HBVP list shall be classified into the Nth (N is a non-negative integer, e.g., N=0) class may be decided according to the block size associated with the BV (denoted as BvBlkSize) and the size of the current block (denoted as CurBlkSize).
 a. In one example, when BvBlkSize is greater than or equal to factor*CurBlkSize, the BV may be classified into the Nth class, wherein the factor is a positive number. For example, factor is equal to 1.
 b. In one example, when BvBlkSize is greater than factor*CurBlkSize, the BV may be classified into the Nth class, wherein the factor is a positive number. For example, factor is equal to 1.
 c. In one example, when BvBlkSize is less than or equal factor*CurBlkSize, the BV may be classified into the Nth class, wherein the factor is a positive number. For example, factor is equal to 1.
 d. In one example, when BvBlkSize is less than factor*CurBlkSize, the BV may be classified into the Nth class, wherein the factor is a positive number. For example, factor is equal to 1.
 e. In one example, when BvBlkSize is equal to factor*CurBlkSize, the BV may be classified into the Nth class, wherein the factor is a positive number. For example, factor is equal to 1.
 f. Alternatively, whether a BV from the HBVP list shall be classified into the Nth class may be decided according to the block dimension associated with the BV and the dimension of the current block.
5. It is proposed that the range of the BV component in the one-dimensional BV search may only depend on the coordinate of the current block.
 a. Alternatively, furthermore, the range of the BV component in the one-dimensional BV search may not depend on the dimension of the current block.
 b. In one example, in the one-dimensional vertical BV search, the vertical BV component is constrained to be less than or equal to y−N1 (N1 is an integer, e.g., N1=0, 8 or −8).
 c. In one example, in the one-dimensional horizontal BV search, the horizontal BV component is constrained to be less than or equal to x−N2 (N2 is an integer, e.g., N2=0, 8 or −8).
 d. Alternatively, the range of the BV component in the one-dimensional BV search may depend on both the dimension and the coordinate of the current block.
  i. For example, in the one-dimensional vertical BV search, the vertical BV component is constrained to be less than or equal to y+H−N1 (N1 is an integer, e.g., N1=0, 8 or −8).
  ii. For example, in the one-dimensional horizontal BV search, the horizontal BV component is constrained to be less than or equal to x+W−N2 (N2 is an integer, e.g., N2=0, 8 or −8).

iii. Alternatively, furthermore, the range of the BV component may further depend on a starting BV (startBvX, startBvY).
1. For example, in the one-dimensional vertical BV search, the vertical BV component is constrained to be less than or equal to y+startBvY+K1*H−N1. N1 is an integer, e.g., N1=0, 8 or −8 and K1 is an integer, e.g., K1=2, 3, 4.
2. For example, in the one-dimensional horizontal BV search, the horizontal BV component is constrained to be less than or equal to x+startBvX+K2*W−N2. N2 is an integer, e.g., N2=0, 8 or −8 and K2 is an integer, e.g., K2=2, 3, 4.

6. It is proposed that SV (sample String Vector) of a block may be used to predict BV or/and SV of its following coded blocks.
   a. In one example, one representative SV may be selected for a block coded in sample string prediction mode and may be stored for the block.
      i. For example, SV of the first sample string may be selected as the representative SV.
      ii. For example, SV of the last sample string may be selected as the representative SV.
      iii. For example, SV of the sample string that covers the center position of the block may be selected as the representative SV.
      iv. For example, SV of the sample string that covers a representative position of the block may be selected as the representative SV.
      v. For example, SV of the sample string with the largest length may be selected as the representative SV. If there are multiple sample strings with the largest length, BV of one of the multiple sample strings may be selected as the representative SV.
      vi. For example, average of BVs of multiple sample strings may be used as the representative SV.
   b. In one example, multiple SVs may be stored for a block coded in sample string prediction mode.
      i. For example, for each M×N sub-block, SV of the sample string that covers most samples of the sub-block is stored for the sub-block. If there are multiple sample strings cover most samples of the sub-block, BV of one of the multiple sample strings may be stored for the sub-block.

7. It is proposed that when predicting BV of a block, SVs of its non-adjacent neighboring blocks may be used.
   a. It is proposed that SVs of non-adjacent neighboring blocks may be inserted into the IBC merge list or/and the IBC AMVP list.
   b. The method described in bullet 1 may be used for insertion of SVs into the IBC merge list or/and the IBC AMVP list.
   c. Alternatively, furthermore, SV of an adjacent neighboring block may be used for predicting BV of a current block.

8. It is proposed that when predicting SV of a block, BVs of its non-adjacent neighboring blocks may be used.
   a. Alternatively, furthermore, when predicting SV of a block, SVs of its non-adjacent neighboring blocks may be used.
   b. Alternatively, furthermore, when predicting SV of a block, SVs or/and BVs of its adjacent neighboring blocks may be used.

9. It is proposed to unify the signaling of BV and SV.
   a. In one example, syntax elements used for indicating SV are used to indicate BV.
   b. In one example, syntax elements used for indicating BV are used to indicate SV.
   c. In one example, a syntax is signaled to indicate whether an SV or a BV is included in a predefined SV/BV set.
      i. For example, the predefined SV/BV set may depend on whether the to be coded syntax is an SV or a BV.
      ii. For example, the predefined SV set may depend on whether the current sample string contains all or partial samples of the current block.
      iii. For example, the predefined SV set may depend on whether the current sample string starts from an even row or an odd row.
      iv. For example, for a BV or an SV of a sample string that contains all samples of the block, the predefined SV/BV set may include {(0, −H), (−W, 0)}, wherein W and H are the width and height of the current block, respectively.
         1. Alternatively, the predefined SV/BV set may include (0, −H).
         2. Alternatively, the predefined SV/BV set may include (0, −H) or (−W, 0).
      v. For example, for an SV of a sample string that only contains partial samples of the block, the predefined SV set may include {(0, −1), (W, 0)}.
         1. Alternatively, the predefined SV/BV set may include {(0, −1)}.
      vi. For example, for an SV of a sample string that starts from an even row of the block, the predefined SV set may include {(0, −1), (−W, 0)}.
      vii. For example, for an SV of a sample string that starts from an odd row of the block, the predefined SV set may include {(0, −1), (W, 0)}.
      viii. Alternatively, furthermore, when the SV or BV is included in the predefined SV/BV set wherein the set contains more than one entry, an index indicating which SV/BV in the set is used may be further signaled.
   d. In one example, for a block coded in IBC mode, a syntax may be signaled to indicate whether a BV of the block is from the BV prediction list.
      i. Alternatively, furthermore, the BV index indicating which BV in the BV prediction list is used by the current block may be signaled only when such syntax indicating that the BV of the block is from the BV prediction list.
   e. In one example, for a block coded in IBC mode, the intra history motion vector prediction list may be directly used for coding the BV and the BV prediction list may not be constructed.
      i. For example, a BV index may be signaled to indicate which BV/SV in the intra history motion vector prediction list is used for the block.
         1. Alternatively, furthermore, if a BV/SV in the intra history motion vector prediction list is used for the block, the BV difference may not be signaled and may be derived as zero.
         2. Alternatively, furthermore, the BV index is constrained to be smaller than the number of elements in the intra history motion vector prediction list in a conformance bitstream.

f. In one example, for a block coded in IBC mode, a syntax may be signaled to indicate whether a BV of the block is from the intra history motion vector prediction list.
  i. Alternatively, furthermore, the BV index may be signaled only when such syntax indicating that the BV of the block is from the intra history motion vector prediction list.
  ii. Alternatively, furthermore, when there is no element in the intra history motion vector prediction list, such syntax is constrained to be false, i.e., BV of the block is constrained to be not from the intra history motion vector prediction list.
g. In one example, the BV (0, 0) may not be inserted into the BV prediction list.

10. It is proposed to unify the BV prediction list construction process and the SV prediction list construction process.
  a. In one example, the SV prediction list construction process is aligned to the BV prediction list construction process.
  b. In one example, the BV prediction list construction process is aligned to the SV prediction list construction process.

11. It is proposed that SVs (derived in the sample string prediction mode) or/and BVs (derived in the intra block copy mode) of parent block or/and at least one brother block (if available) of a current block may be used in the BV estimation process of the current block.
  a. In one example, SVs or/and BVs of parent block or/and at least one brother block (if available) of a current block may be considered as candidate BVs in the BV estimation process.
    i. Alternatively, furthermore, SVs or/and BVs of parent block or/and at least one brother block (if available) of a current block may be tested before all other candidate BVs.
    ii. Alternatively, furthermore, if the smallest cost achieved by the SVs or/and BVs of parent block or/and at least one brother block (if available) of a current block is less than a threshold, all other candidate BVs may be skipped.
  b. Alternatively, furthermore, SVs or/and BVs of at least one descendant of at least one brother block of a current block may be used in the BV estimation process of the current block.

12. It is proposed that when intra block copy mode is performed before the sample string prediction mode for a block, BVs obtained in the intra block copy mode may be used in the SV estimation process of the current block, and vice versa.
  a. In one example, the N (e.g., N=1, 2, 3 etc.) BVs that achieves the smallest costs in the intra block copy mode may be considered as candidate SVs in the SV estimation process.
    i. Alternatively, furthermore, the N BVs may be tested before all other candidate SVs.
    ii. Alternatively, furthermore, if the smallest cost achieved by the N BVs is less than a threshold in the SV estimation process, all other candidate SVs may be skipped.
    iii. The N BVs may be considered in the SV estimation process even the intra block copy mode is not the current best mode before checking the sample string prediction mode.
  b. In one example, the N BVs that achieves the smallest costs in the intra block copy mode may be used in the SV estimation process when a sample string contains all samples of the block.
  c. In one example, the N BVs that achieves the smallest costs in the intra block copy mode may be used in the SV estimation process when a sample string contains partial samples of the block.
  d. In one example, N may be different for a first sample string containing all samples of the block and a second sample string containing partial samples of the block.
  e. N may be different for blocks with different dimensions.

13. It is proposed that the BV index (e.g., cbvp_index indicating which BV in the BV prediction list is used by a current block) is constrained to be smaller than the number of BVs in the BV prediction list in a conformance bitstream.
  a. In one example, when there are N (N is an integer) BVs in the BV prediction list, the BV index is constrained to be smaller than or equal to N−1.
  b. Alternatively, furthermore, when there is no element in the BV prediction list, it is proposed that the indication of whether the BV of a current block is from the BV prediction list is constrained to be false, i.e., BV of the current block is constrained to not be from the BV prediction list.

14. It is proposed that the SV index (e.g., the sv_recent_idx indicating which SV/BV in the intra history motion vector prediction list is used by a sample string) is constrained to be smaller than the number of elements in the intra history motion vector prediction list in a conformance bitstream.
  a. Alternatively, furthermore, when there is no element in the intra history motion vector prediction list, it is proposed that the indication (e.g., sv_recent_flag) of whether the SV of a current sample string is from the intra history motion vector prediction list is constrained to be false, i.e., SV of the current sample string is constrained to be not from the intra history motion vector prediction list.

15. It is proposed that whether/how to insert a SV (sample string vector) associated with a first sample string of a reference block (e.g., an adjacent or/and non-adjacent neighboring block) into a first list comprising previously coded/decoded BV(s) or/and SV(s) used to code the BV or/and SV of the current block (such as IBC merge list or/and IBC AMVP list or/and SV merge list or/and SV AMVP list) may depend on the length and/or position and/or shape of the first sample string and/or the block size of current and/or reference block. In the following discussion, W and H denote the width and height of the reference block (e.g., the adjacent or/and non-adjacent neighboring block), respectively, and L is the length of the sample string.
  a. In one example, the SV associated with the first sample string is not allowed to be inserted into the first list if the first sample string forms a rectangle.
  b. In one example, the SV associated with the first sample string is not allowed to be inserted into the first list if the length L of the sample string is equal to certain values, e.g., the multiple of W.
    i. In one example, L % W is equal to 0.
    ii. Alternatively, the first sample string is not allowed to be inserted into the first list if L % W==0 and/or L !=W.

iii. Alternatively, the first sample string is not allowed to be inserted into the first list if L !=W.
iv. In one example, the SV associated with the first sample string is not allowed to be inserted into the first list if the length L of the sample string is equal to N*W, wherein N is an integer.
  1. In one example, N>0.
  2. In one example, N>1.
  3. In one example, N<=H.
c. Alternatively, the SV associated with the first sample string may be inserted into the first list only if the length L of the sample string is equal to N*W, wherein N is a specific number.
  i. For example, N=0.25, 0.5, 1, 1.5 . . . .
d. Alternatively, the SV associated the first sample string is not allowed to be inserted into the first list if the it is at a specific position.
  i. In one example, the first sample string is the last (or bottom) sample string of the adjacent or/and non-adjacent neighboring block.
  ii. In one example, the first sample string is the first (or top) sample string of the adjacent or/and non-adjacent neighboring block.
  iii. In one example, the first sample string is the Nth (from top to bottom) sample string of the adjacent or/and non-adjacent neighboring block.
e. Alternatively, the SV associated the first sample string is allowed to be inserted into the first list if it is at a specific position.
  i. In one example, the first sample string is the last (or bottom) sample string of the adjacent or/and non-adjacent neighboring block.
  ii. In one example, the first sample string is the first (or top) sample string of the adjacent or/and non-adjacent neighboring block.
  iii. In one example, the first sample string is the Nth (from top to bottom) sample string of the adjacent or/and non-adjacent neighboring block.
f. Alternatively, the SV associated the first sample string is allowed to be inserted into the first list if not all the sample strings in the adjacent or/and non-adjacent neighboring block are with a rectangle shape.
g. In this bullet, the statement "inserting a SV (sample string vector) associated with a first sample string of an adjacent or/and non-adjacent neighboring block into a first list comprising previously coded/decoded BV(s) or/and SV(s) used to code the BV or/and SV of the current block", can also be replaced as "treating a SV (sample string vector) associated with a first sample string of an adjacent or/and non-adjacent neighboring block as a prediction to code the BV or/and SV of the current block.", or "using a SV (sample string vector) associated with a first sample string of an adjacent or/and non-adjacent neighboring block to code the BV or/and SV of the current block.".

16. It is proposed that whether/how to store an SV (sample string vector) associated with a first sample string of the current block may depend on the length and/or position and/or shape of the first sample string. In the following discussion, W and H denote the width and height of the current block, respectively, and L is the length of the sample string.
  a. The SV may be stored to be used to code the BV or/and SV of a succeeding block.
    i. In one example, The SV may be stored to be inserted into a list comprising previously coded/decoded BV(s) or/and SV(s) used to code the BV or/and SV of the succeeding block (such as IBC merge list or/and IBC AMVP list or/and SV merge list or/and SV AMVP list).
    ii. In one example, The SV may be stored to be used as a prediction to code the BV or/and SV of the succeeding block.
  b. If it is decided to not to store the SV, the associated samples/positions/blocks/subblocks may be marked as "unavailable", or "non-intra coded" or "inter-coded" or "BV/SV unavailable.
  c. In one example, the SV associated with the first sample string is not stored if the first sample string forms a rectangle.
  d. In one example, the SV associated with the first sample string is not stored if the length L of the sample string is equal to the multiple of W, e.g., L % W is equal to 0.
    i. Alternatively, the first sample string is not stored if L % W==0 and/or L W.
    ii. Alternatively, the first sample string is not stored if L !=W.
  e. In one example, the SV associated with the first sample string is not stored if the length L of the sample string is equal to N*W, wherein N is an integer.
    i. In one example, N>0.
    ii. In one example, N>1.
    iii. In one example, N<=H.
  f. Alternatively, the SV associated with the first sample string may be stored only if the length L of the sample string is equal to N*W, wherein N is a specific number.
    i. For example, N=0.25, 0.5, 1, 1.5 . . . .
  g. Alternatively, the SV associated the first sample string is not stored if the it is at a specific position.
    i. In one example, the first sample string is the last (or bottom) sample string of the current block.
    ii. In one example, the first sample string is the first (or top) sample string of the current block.
    iii. In one example, the first sample string is the Nth (from top to bottom) sample string of the current block.
  h. Alternatively, the SV associated the first sample string may be stored if the it is at a specific position.
    i. In one example, the first sample string is the last (or bottom) sample string of the current block.
    ii. In one example, the first sample string is the first (or top) sample string of the current block.
    iii. In one example, the first sample string is the Nth (from top to bottom) sample string of the current block.
  i. Alternatively, the SV associated the first sample string may be stored if not all the sample strings in the current block are with a rectangle shape.

5 Embodiments

Below are some example embodiments for some of the invention aspects summarized above in this Section, which can be applied to the VVC specification. Most relevant parts that have been added or modified are bolded, underlined and italicized, e.g., "using A*and B* ", and some of the deleted parts are italicized and enclosed in bolded double brackets, e.g., "based on B". There may be some other changes that are editorial in nature and thus not highlighted.

5.1 Embodiment #1

Section 9.5.6.3.2. Block Vector Prediction
First, constructing the category blockMotionClassY (Y=0-6) according to the following steps:
  a) Initialize the optional block copy intra prediction historical motion information candidate number NumAllowedHbvpCand to Min(CntHbvp, NumOfHbvpCand).
  b) If NumAllowedHbvpCand is equal to 0, and both MvPredXBv and MvPredYBv are equal to 0, end the export process, otherwise continue to perform the following steps.
  c) Otherwise, Y is from 0 to 6, and the number of motion information candidates cntClassY for intra-frame prediction for block copying in each class blockMotionClassY is initialized to 0. For X=0~NumAllowedHbvpCand-1, HbvpCandidateList [X] is classified as follows:
    1) If widthCandX*heightCandX is greater than or equal to ***widthCur*heightCur*** , add HbvpCandidateList [X] to blockMotionClass0, and add 1 to the value of cntClassY;
    2) If cntCandX is greater than or equal to 3, add HbvpCandidateList[X] to blockMotionClass1, and add 1 to the value of cntClassY;
    3) If xCandX is less than xCur and yCandX is less than yCur, add HbvpCandidateList[X] to blockMotionClass4, and add 1 to the value of cntClassY;
    4) Otherwise, if xCandX is greater than or equal to xCur+widthCur, add HbvpCandidateList[X] to blockMotionClass5, and add 1 to the value of cntClassY;
    5) Otherwise, if yCandX is greater than or equal to yCur+heightCur, add HbvpCandidateList[X] to blockMotionClass6, and add 1 to the value of cntClassY;
    6) Otherwise, if yCandX is less than yCur, add HbvpCandidateList[X] to blockMotionClass3, and add 1 to the value of cntClassY;
    7) Otherwise, add HbvpCandidateList[X] to blockMotionClass2, and add 1 to the value of cntClassY.
Then, mark the block vector of the intra-frame copy motion information in blockMotionClassY as bvClassY, and derive the candidate class list CbvpCandidateList according to the following method:
  a) Initialize cntCbvp, cntCheck and Y to 0;
  b) If the value of cntClassY is greater than 0, perform the following steps:
    1) Initialize candIdx to 0;
    2) If cntCbvp is equal to 0, the block vector of CbvpCandidateList [cntCbvp] is equal to bvClassY, cntCbvp is increased by 1, and step c) is executed;
    3) Otherwise, if the block vector of CbvpCandidateList [candIdx] is the same as bvClassY, go to step c);
    4) Otherwise, add 1 to candIdx, if candIdx is less than cntCheck, go to step 3);
    5) Otherwise, the block vector of CbvpCandidateList [cntCbvp] is equal to bvClassY, and cntCbvp plus 1.
  c) Add 1 to the value of Y and perform the following steps:
    1) If the value of Y is less than or equal to 2, set the value of cntCheck to cntCbvp, and then continue to step b);
    2) Otherwise, if Y is less than 7, continue to step b);
    3) Otherwise the process of deriving the CbvpCandidateList *based on the historical motion information candidate Hbvp CandidateList* ends.
*Then, if the value of cntCbvp is less than 7, follow the steps below to derive the candidate class list CbvpCandidateList based on the indirect neighboring block vector:*
  *a) Initialize the number of available elements cntNoAdjList in NoAdjBlockMotion List to 0, and construct the candidate list NoAdjBlock MotionList according to the following steps:*
    *1) If the upper left corner coordinate is (xCurr-8, yCurr + heightCur/2), the block in which the position is located is available and is in block replication intra prediction mode, then add its block vector to NoAdjBlockMotionList [cntNoAdjList], and add 1 to cntNoAdjList;*
    *2) If the upper left corner coordinate is (xCur + widthCur/2, yCur-8), the block at the position is available and is in block copy intra prediction mode, then add its block vector to NoAdjBlockMotion List [ cntNoAdjList], and add 1 to cntNoAdjList;*
    *3) If the block in the upper left corner with coordinates (xCur-8, yCur-8) is available and is in block copy intra prediction mode, add its block vector to No AdjBlockMotionList [cntNoAdjList], and add 1 to cntNoAdjList;*
    *4) If the upper left corner coordinate is (xCur + widthCur, yCurr-8), the block at the position is available and is in block copy intra prediction mode, then add its block vector to NoAdjBlockMotion List [cntNoAdjList], and add 1 to cntNoAdjList;*
    *5) If the block in the upper left corner with coordinates (xCur-8, yCur + heightCur) is available and is in block copy intra prediction mode, add its block vector to NoAdjBlockMotionList [cntNoAdjList], and add 1 to cntNoAdjList;*
  *b) If cntNoAdjList is equal to 0, go to step d). Otherwise, initialize cntNoAdjCbvp to 0, and initialize Y to cntCbvp. Perform the following steps:*
    *1) Initialize cantIdx to 0;*
    *1) If cntCbvp is equal to 0, the block vector of CbvpCandidateList [cntCbvp] is equal to NoAdjBlockMotion List[cntNoAdjCbvp], cntCbvp is increased by 1, cntNoAdjCbvp is increased by 1, and step c) is executed;*
    *3) Otherwise, if the block vector of CbvpCandidateList [cantIdx] is the same as NoAdjBlockMotion List[cntNoAdjCbvp], go to step c);*
    *4) Otherwise, add 1 to candIdx, if candIdx is less than cntCheck, go to step 3);*
    *5) Otherwise, the block vector of CbvpCandidateList [cntCbvp] is equal to NoAdjBlockMotion List[cntNoAdjCbvp], and cntCbvp is increased by 1.*
  *c) Add 1 to the value of Y and perform the following steps:*

*1) If the value of Y is less than or equal to 2, set the value of cnt Check to cntCbvp, and then continue to step b);*
*2) Otherwise, if Y is less than 7, continue to step b);*
*3) Otherwise, go to d);*
*d) The derivation process of CbvpCandidateList based on the motion information candidate of the non-directly neighboring block vector is finished.*

If cntCbvp is equal to 0, both MvPredXBv and MvPredYBv are equal to 0. Otherwise, MvPredXBv and MvPredYBv are respectively equal to the abscissa and ordinate of CbvpCandidateList [CbvpIndex].

5.2 Embodiment #2

1.1.1.1.1 Block Vector Prediction

The width and height of the current prediction unit are denoted as widthCur and heightCur, respectively, and the horizontal and vertical coordinates of the upper left corner of the current prediction unit are denoted as xCur and yCur, respectively. For X=0~NumOfIntraHmvpCand-1, the width and height of IntraHmvpCandidateList[X] are denoted as widthCandX and heightCandX, and the horizontal and vertical coordinates of the upper left corner of IntraHmvpCandidateList[X] are denoted as xCandX and yCandX, and the size of IntraHmvpCandidateList[X] is denoted as sizeCandX, the number of repetitions of IntraHmvpCandidateList[X] is denoted as cntCandX, and the displacement vector of IntraHmvpCandidateList[X] is denoted as intraMvCandX.

First, the category blockMotionClassY (Y=0~6) can be constructed according to the following steps:
  a) Initialize the optional block copy intra prediction historical motion information candidate number NumAllowedHbvpCand to Min(CntIntraHmbvp, NumOfIntraHmvpCand).
  b) If NumAllowedHbvpCand is equal to 0, block vector prediction is not performed and the export process is ended, otherwise, continue to perform the following steps.
  c) Otherwise, Y is from 0 to 6, and cbvpValidClassY is initialized to 0.
  d) If CbvpIndex is equal to 0, for X=NumAllowedHbvpCand-1~0, HbvpCandidateList [X] is classified as follows:
    1) If widthCandX*heightCandX is greater than or equal to 64, and cbvpValidClass0 is equal to 0, add IntraHmvpCandidateList[X] to blockMotionClass0 and make cbvpValidClass0 equal to 1;
    2) If cbvpValidClass0 is equal to 1, end the classification process;
  e) If CbvpIndex is equal to 1, for X=NumAllowedHbvpCand-1~0, HbvpCandidateList [X] is classified as follows:
    1) If widthCandX*heightCandX is greater than or equal to 64, and cbvpValidClass0 is equal to 0, add IntraHmvpCandidateList[X] to blockMotionClass0 and make cbvpValidClass0 equal to 1;
    2) Otherwise, if cntCandX is greater than or equal to 3 and cbvpValidClass1 is equal to 0, add IntraHmvpCandidateList[X] to blockMotionClass1 and make cbvpValidClass1 equal to 1;
    3) If cbvpValidClass1 is equal to 1, end the classification process;
  f) If CbvpIndex is equal to 2, for X=NumAllowedHbvpCand-1~0, HbvpCandidateList [X] is classified as follows:
    1) If widthCandX*heightCandX is greater than or equal to 64, and cbvpValidClass0 is equal to 0, add IntraHmvpCandidateList[X] to blockMotionClass0 and make cbvpValidClass0 equal to 1;
    2) Otherwise, if cntCandX is greater than or equal to 3 and cbvpValidClass1 is equal to 0, add IntraHmvpCandidateList[X] to blockMotionClass1 and make cbvpValidClass1 equal to 1;
    3) Otherwise, if xCandX is less than xCur, and yCandX is greater than or equal to yCur, and yCandX is less than yCur+heightCur, and cbvpValidClass2 is equal to 0, add IntraHmvpCandidateList[X] to blockMotionClass2 and make cbvpValidClass2 equal to 1;
    4) If cbvpValidClass2 is equal to 1, end the classification process;
  g) If CbvpIndex is equal to 3, for X=NumAllowedHbvpCand-1~0, HbvpCandidateList [X] is classified as follows:
    1) If widthCandX*heightCandX is greater than or equal to 64, and cbvpValidClass0 is equal to 0, add IntraHmvpCandidateList[X] to blockMotionClass0 and make cbvpValidClass0 equal to 1;
    2) Otherwise, if cntCandX is greater than or equal to 3 and cbvpValidClass1 is equal to 0, add IntraHmvpCandidateList[X] to blockMotionClass1 and make cbvpValidClass1 equal to 1;
    3) Otherwise, if yCandX is less than yCur, and xCandX is greater than or equal to xCur, and xCandX is less than xCur+widthCur, and cbvpValidClass3 is equal to 0, add IntraHmvpCandidateList[X] to blockMotionClass3 and make cbvpValidClass3 equal to 1;
    4) If cbvpValidClass3 is equal to 1, end the classification process;
  h) If CbvpIndex is equal to 4, for X=NumAllowedHbvpCand-1~0, HbvpCandidateList [X] is classified as follows:
    1) If widthCandX*heightCandX is greater than or equal to 64, and cbvpValidClass0 is equal to 0, add IntraHmvpCandidateList[X] to blockMotionClass0 and make cbvpValidClass0 equal to 1;
    2) Otherwise, if cntCandX is greater than or equal to 3 and cbvpValidClass1 is equal to 0, add IntraHmvpCandidateList[X] to blockMotionClass1 and make cbvpValidClass1 equal to 1;
    3) Otherwise, if xCandX is less than xCur, and yCandX is less than yCur, and cbvpValidClass4 is equal to 0, add IntraHmvpCandidateList[X] to blockMotionClass4 and make cbvpValidClass4 equal to 1;
    4) If cbvpValidClass4 is equal to 1, end the classification process;
  i) If CbvpIndex is equal to 5, for X=NumAllowedHbvpCand-1~0, HbvpCandidateList [X] is classified as follows:
    1) If widthCandX*heightCandX is greater than or equal to 64, and cbvpValidClass0 is equal to 0, add IntraHmvpCandidateList[X] to blockMotionClass0 and make cbvpValidClass0 equal to 1;
    2) Otherwise, if cntCandX is greater than or equal to 3 and cbvpValidClass1 is equal to 0, add IntraHmvpCandidateList[X] to blockMotionClass1 and make cbvpValidClass1 equal to 1;
    3) Otherwise, if xCandX is greater than or equal to xCur+widthCur, and yCandX is less than yCur, and cbvpValidClass5 is equal to 0, add IntraHmvpCandidateList[X] to blockMotionClass5 and make cbvpValidClass5 equal to 1;
4) If cbvpValidClass5 is equal to 1, end the classification process;
j) If CbvpIndex is equal to 6, for X=NumAllowedHbvpCand−1~0, HbvpCandidateList [X] is classified as follows:
1) If widthCandX*heightCandX is greater than or equal to 64, and cbvpValidClass0 is equal to 0, add IntraHmvpCandidateList[X] to blockMotionClass0 and make cbvpValidClass0 equal to 1;
2) Otherwise, if cntCandX is greater than or equal to 3 and cbvpValidClass1 is equal to 0, add IntraHmvpCandidateList[X] to blockMotionClass1 and make cbvpValidClass1 equal to 1;
3) Otherwise, if yCandX is greater than or equal to yCur+heightCur, xCandX is less than xCur, and cbvpValidClass6 is equal to 0, add IntraHmvpCandidateList[X] to blockMotionClass6 and make cbvpValidClass6 equal to 1;
4) If cbvpValidClass6 is equal to 1, the classification process is ended.

Then, the block vector of the intra block copy motion information in blockMotionClassY is denoted as bvClassY, and for Y=0~6, BvpPosValidClassY is initialized to 1. Let Y be equal to CbvpIndex, and export the candidate class CbvpCandidateList[CbvpIndex] as follows:
a) If cbvpValidClassY is equal to 1, the block vector of CbvpCandidateList [CbvpIndex] is equal to bvClassY;
b) Otherwise, the candidate class CbvpCandidateList [CbvpIndex] is derived based on the spatial neighboring block vector candidate BlockMotionSpatialCandidate as follows:
1) If CbvpIndex is an even number, the candidate class CbvpCandidateList[CbvpIndex] is derived as follows:
a) If the current coding unit belongs to an I picture, and the block in which the position whose coordinate of the upper left corner is (xCur−8, yCur+heightCur/2) is located has been reconstructed, and belongs to the same CTU as the current coding unit, and is a string copy intra prediction mode or block copy intra prediction mode, then BlockMotionSpatialCandidateA is equal to the last string vector or block vector in scanning order in the 4×4 sub-block in which the position is located;
b) Otherwise, if the block in which the position of the current coding unit whose coordinate of the upper left corner is (xCur−4, yCur+heightCur/2) is located has been reconstructed and is the string copy intra prediction mode, then BlockMotionSpatialCandidateA is equal to the last string vector in scanning order in the 4×4 sub-block in which the position is located;
c) If BlockMotionSpatialCandidateA exists and the string length StrLen of the last string satisfies the condition StrLen % widthCandA !=0, then the block vector of CbvpCandidateList [CbvpIndex] is equal to BlockMotionSpatialCandidateA;
d) Otherwise, BvpPosValidClassY is equal to −1.
2) Otherwise, the candidate class CbvpCandidateList [CbvpIndex] is derived as follows:
a) If the current coding unit belongs to an I picture, and the block in which the position whose coordinate of the upper left corner is (xCur+widthCur/2, yCur−8) is located has been reconstructed, and belongs to the same CTU as the current coding unit, and is a string copy intra prediction mode or block copy intra prediction mode, then BlockMotionSpatialCandidateB is equal to the last string vector or block vector in scanning order in the 4×4 sub-block in which the position is located
b) Otherwise, if the block in which the position of the current coding unit whose coordinate of the upper left corner is (xCur+widthCur/2, yCur−4) is located has been reconstructed and is the string copy intra prediction mode, then BlockMotionSpatialCandidateB is equal to the last string vector in scanning order in the 4×4 sub-block in which the position is located
c) If BlockMotionSpatialCandidateB exists and the string length StrLen of the last string satisfies the condition StrLen % widthCandB !=0, then the block vector of CbvpCandidateList [CbvpIndex] is equal to BlockMotionSpatialCandidateB;
d) Otherwise, BvpPosValidClassY is equal to −1.

If BvpPosValidClassCbvpIndex is equal to −1, no block vector prediction is performed. Otherwise, MvPredXBv and MvPredYBv are respectively equal to the horizontal and vertical coordinates of CbvpCandidateList [CbvpIndex].

Figure 7:
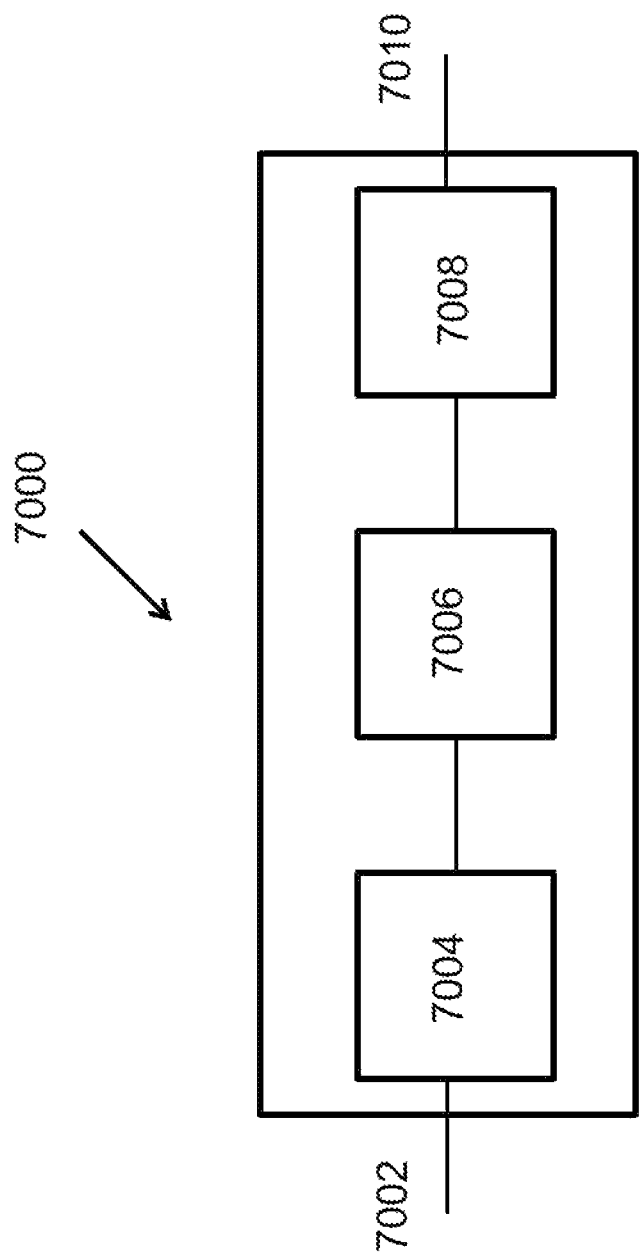
FIG. 7 is a block diagram showing an example video processing system in which various techniques disclosed herein may be implemented.

FIG. 7 is a block diagram showing an example video processing system 7000 in which various techniques disclosed herein may be implemented. Various implementations may include some or all of the components of the system 7000. The system 7000 may include input 7002 for receiving video content. The video content may be received in a raw or uncompressed format, e.g., 8 or 10 bit multi-component pixel values, or may be in a compressed or encoded format. The input 7002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 7000 may include a coding component 7004 that may implement the various coding or encoding methods described in the present document. The coding component 7004 may reduce the average bitrate of video from the input 7002 to the output of the coding component 7004 to produce a coded representation of the video. The coding techniques are therefore sometimes called video compression or video transcoding techniques. The output of the coding component 7004 may be either stored, or transmitted via a communication connected, as represented by the component 7006. The stored or communicated bitstream (or coded) representation of the video received at the input 7002 may be used by the component 7008 for generating pixel values or displayable video that is sent to a display interface 7010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 8:
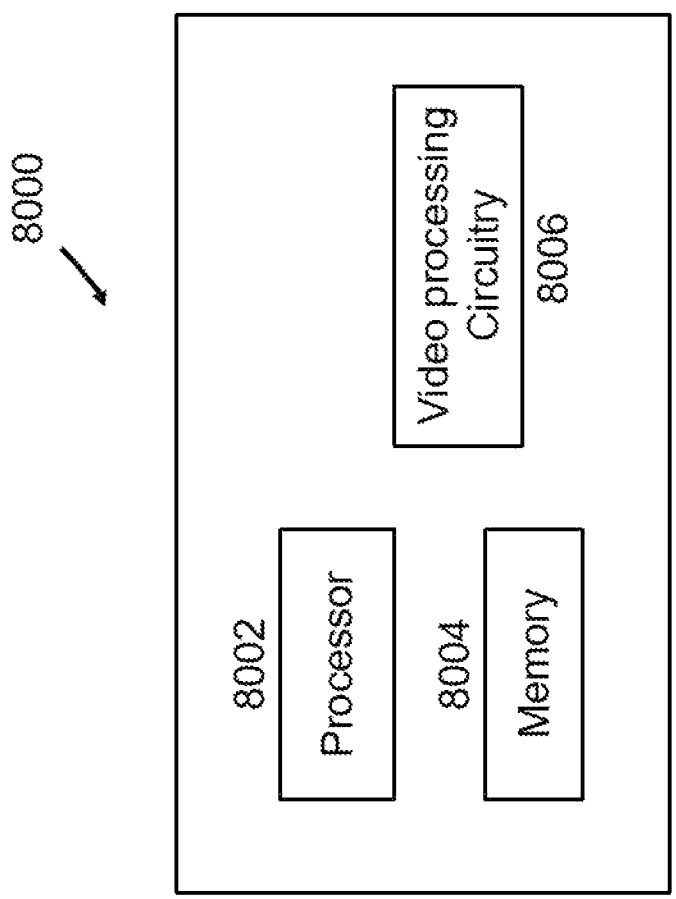
FIG. 8 is a block diagram of an example hardware platform used for video processing.

FIG. 8 is a block diagram of a video processing apparatus 8000. The apparatus 8000 may be used to implement one or more of the methods described herein. The apparatus 8000 may be embodied in a smartphone, tablet, computer, Internet of Things (IoT) receiver, and so on. The apparatus 8000 may include one or more processors 8002, one or more memories 8004 and video processing hardware 8006. The processor(s) 8002 may be configured to implement one or more methods described in the present document (e.g., in FIGS. 12-14). The memory (memories) 8004 may be used for storing data and code used for implementing the methods and techniques described herein. The video processing hardware 8006 may be used to implement, in hardware circuitry, some techniques described in the present document. In some embodiments, the hardware 8006 may be partly or entirely in the one or more processors 8002, e.g., a graphics processor.

Figure 9:
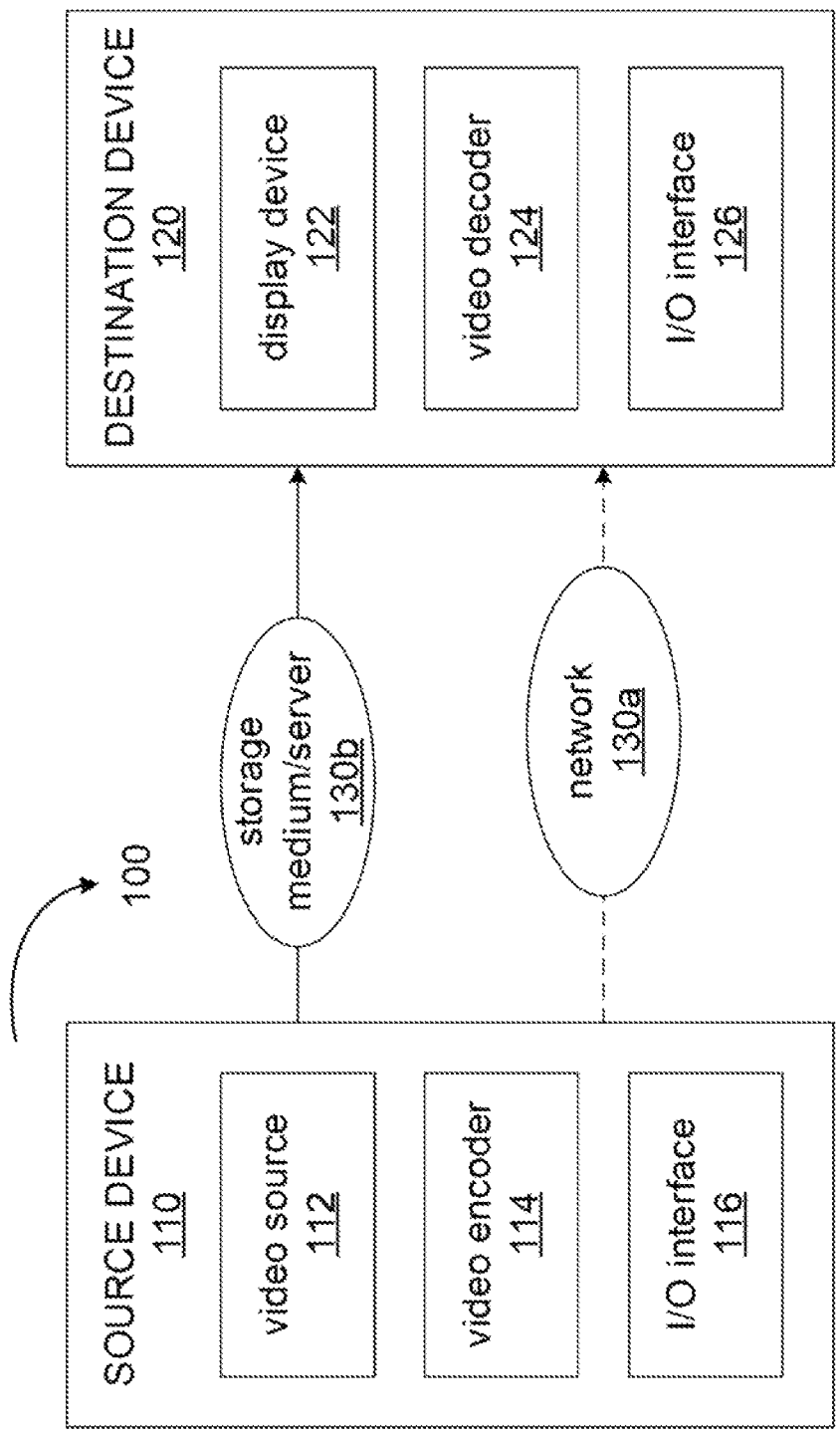
FIG. 9 is a block diagram that illustrates an example video coding system that can implement some embodiments of the present disclosure.

FIG. 9 is a block diagram that illustrates an example video coding system 100 that may utilize the techniques of this disclosure. As shown in FIG. 9, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 10:
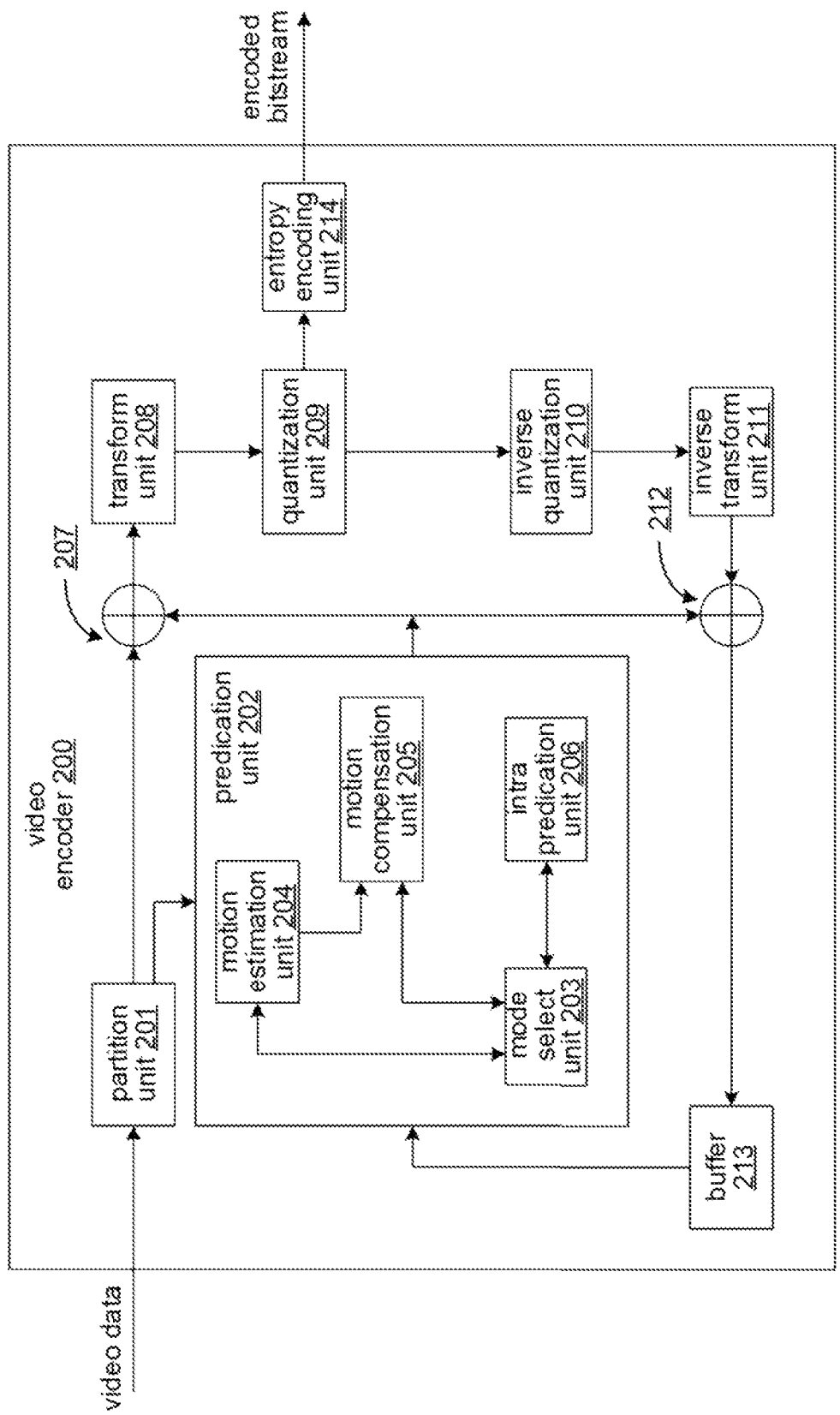
FIG. 10 is a block diagram that illustrates an example of an encoder that can implement some embodiments of the present disclosure.

FIG. 10 is a block diagram illustrating an example of video encoder 200, which may be video encoder 114 in the system 100 illustrated in FIG. 9.

Video encoder 200 may be configured to perform any or all of the techniques of this disclosure. In the example of FIG. 10, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 10 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 11:
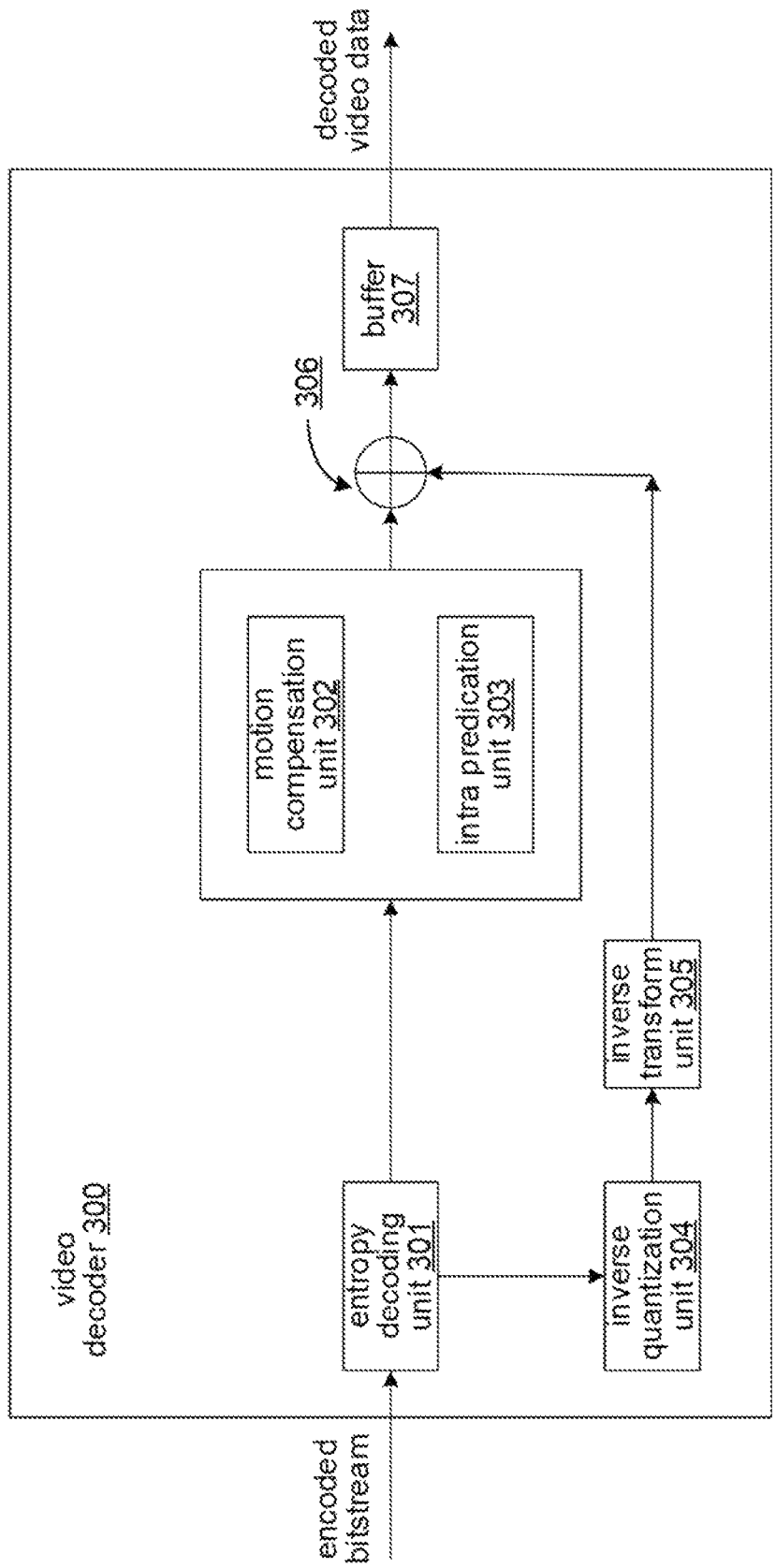
FIG. 11 is a block diagram that illustrates an example of a decoder that can implement some embodiments of the present disclosure.

FIG. 11 is a block diagram illustrating an example of video decoder 300 which may be video decoder 114 in the system 100 illustrated in FIG. 9.

The video decoder 300 may be configured to perform any or all of the techniques of this disclosure. In the example of FIG. 11, the video decoder 300 includes a plurality of functional components. The techniques described in this disclosure may be shared among the various components of the video decoder 300. In some examples, a processor may be configured to perform any or all of the techniques described in this disclosure.

In the example of FIG. 11, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 10).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 12:
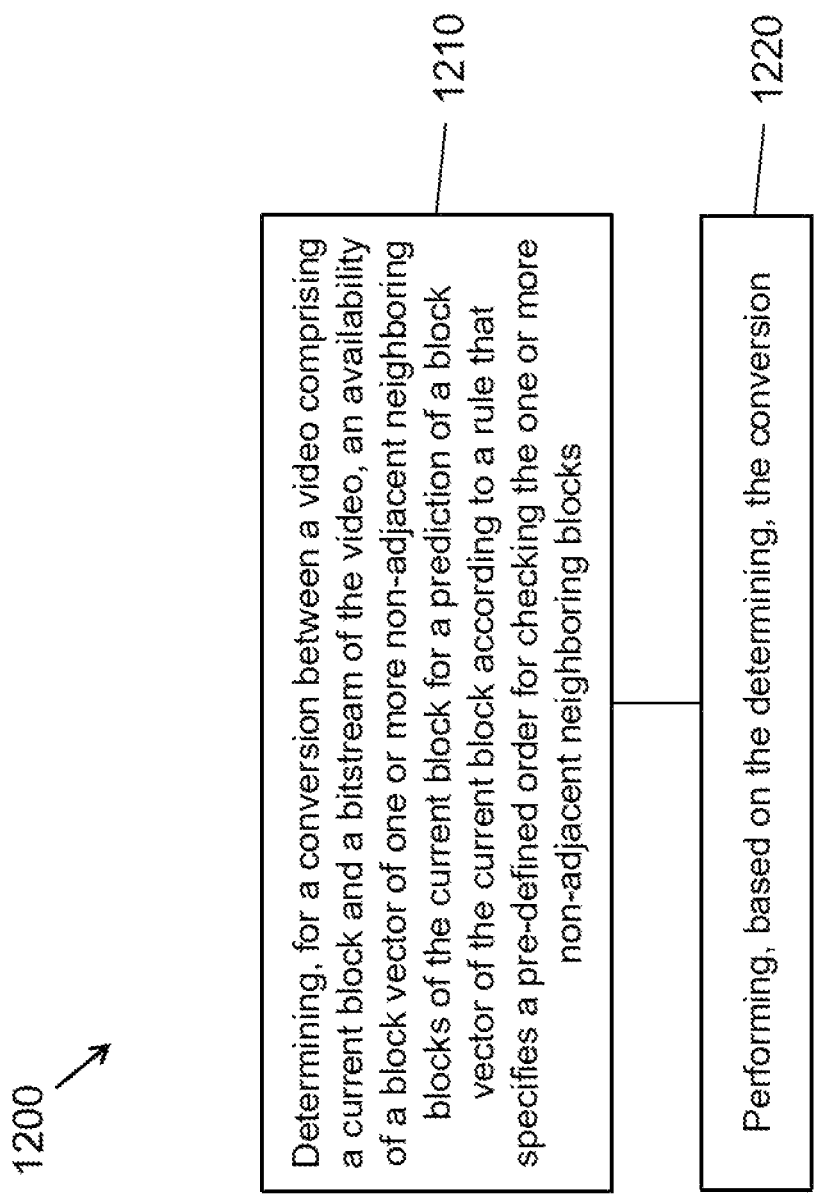
FIGS. 12-14 show flowcharts for example methods of video processing.
Figure 13:
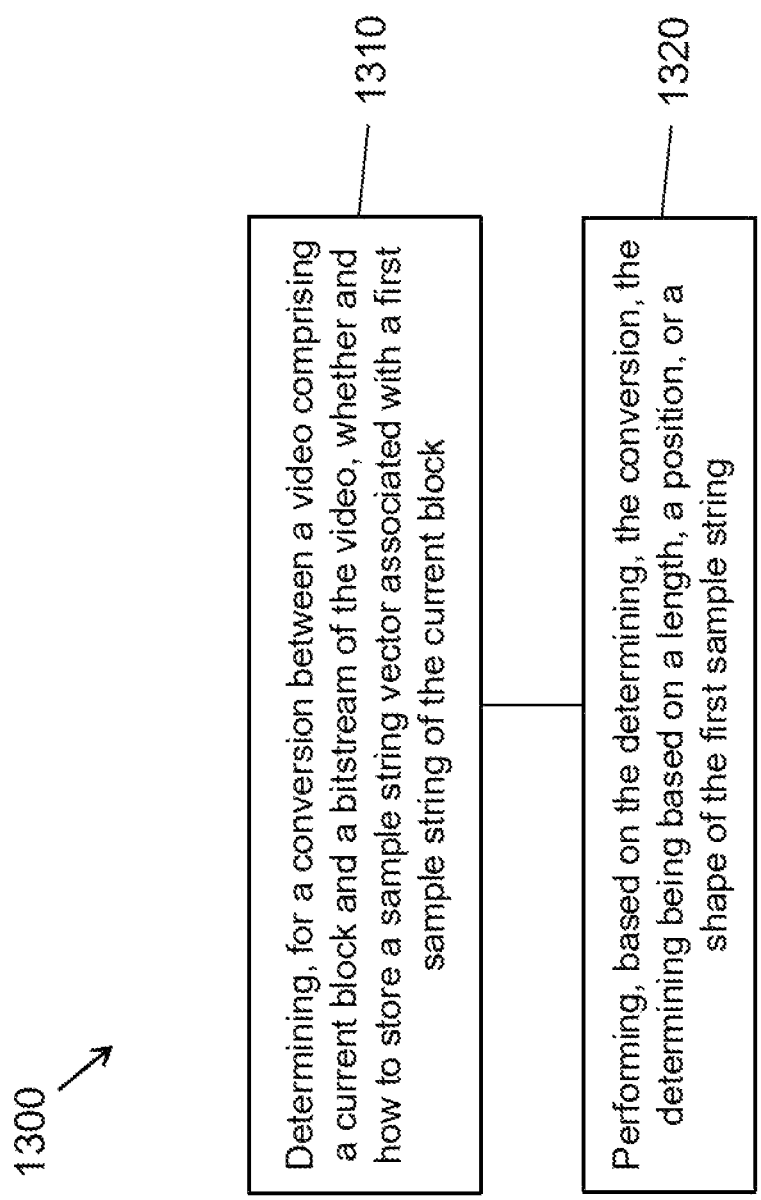
Figure 14:
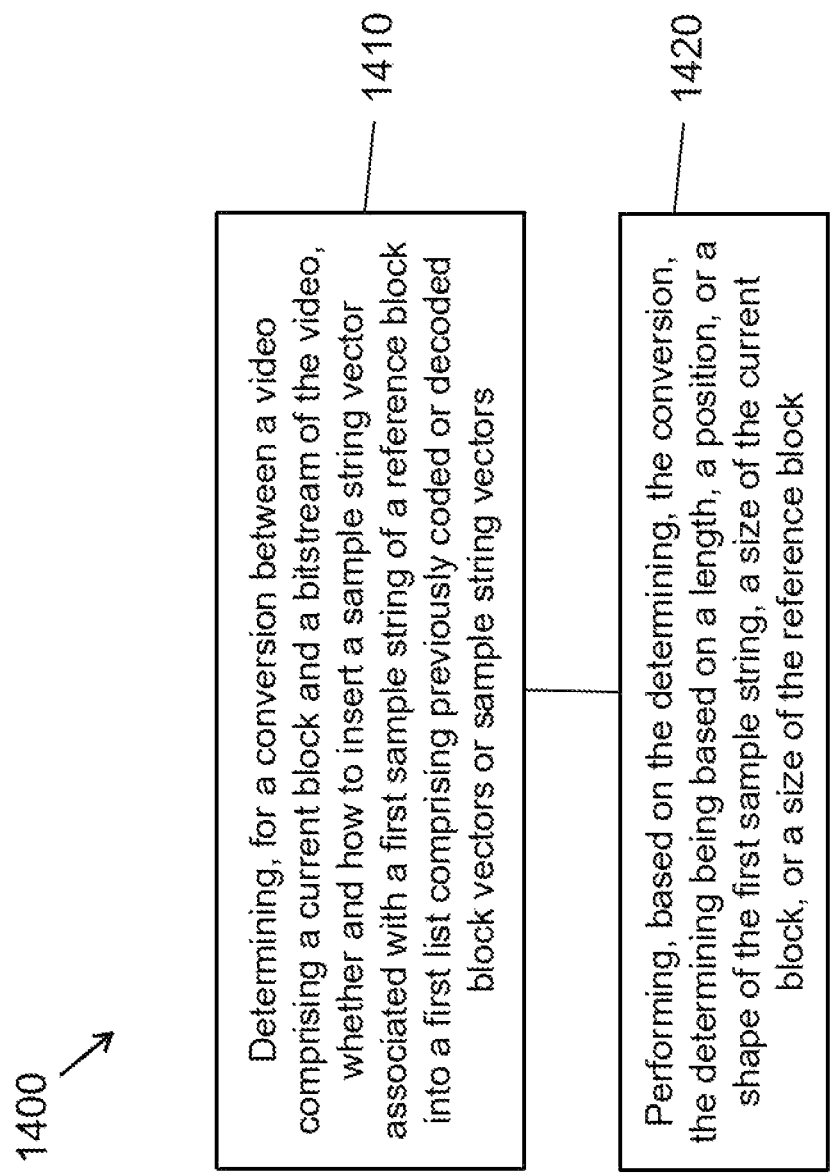

FIGS. 12-14 show example methods that can implement the technical solution described above in, for example, the embodiments shows in FIGS. 7-11.

FIG. 12 shows a flowchart for an example method 1200 of video processing. The method 1200 includes, at operation 1210, determining, for a conversion between a video comprising a current block and a bitstream of the video, an availability of a block vector of one or more non-adjacent neighboring blocks of the current block for a prediction of a block vector of the current block according to a rule that specifies a pre-defined order for checking the one or more non-adjacent neighboring blocks.

The method 1200 includes, at operation 1220, performing, based on the determining, the conversion.

FIG. 13 shows a flowchart for an example method 1300 of video processing. The method 1300 includes, at operation 1310, determining, for a conversion between a video comprising a current block and a bitstream of the video, whether and how to store a sample string vector associated with a first sample string of the current block.

The method 1300 includes, at operation 1320, performing, based on the determining, the conversion, the determining being based on a length, a position, or a shape of the first sample string.

FIG. 14 shows a flowchart for an example method 1400 of video processing. The method 1400 includes, at operation 1410, determining, for a conversion between a video comprising a current block and a bitstream of the video, whether and how to insert a sample string vector associated with a first sample string of a reference block into a first list comprising previously coded or decoded block vectors or sample string vectors.

The method 1400 includes, at operation 1420, performing, based on the determining, the conversion, the determining being based on a length, a position, or a shape of the first sample string, a size of the current block, or a size of the reference block.

The following solutions show example embodiments of techniques discussed in the previous section (e.g., items 1-16).

A listing of solutions preferred by some embodiments is provided next.

A1. A method of video processing, comprising determining, for a conversion between a video comprising a current block and a bitstream of the video, an availability of a block vector of one or more non-adjacent neighboring blocks of the current block for a prediction of a block vector of the current block according to a rule, and performing, based on the determining, the conversion, wherein the rule specifies a pre-defined order for checking the one or more non-adjacent neighboring blocks.

A2. The method of solution A1, wherein the pre-defined order is based on a coding information.

A3. The method of solution A1, wherein a first non-adjacent neighboring block of the one or more non-adjacent neighboring blocks is located in a picture different from a current picture comprising the current block.

A4. The method of solution A3, wherein the picture is a reference picture of the current block.

A5. The method of solution A3, wherein each non-adjacent neighboring block of the plurality of non-adjacent neighboring blocks is located in the picture.

A6. The method of solution A3, wherein a second non-adjacent neighboring block of the plurality of non-adjacent neighboring blocks is located in the current picture.

A7. A method of video processing, comprising determining, for a conversion between a video comprising a current block and a bitstream of the video, whether and how to store a sample string vector associated with a first sample string of the current block, and performing, based on the determining, the conversion, wherein the determining is based on a length, a position, or a shape of the first sample string.

A8. The method of solution A7, wherein the sample string vector is used to code a block vector of a subsequent block or a sample string vector of the subsequent block.

A9. The method of solution A8, wherein the sample string vector is stored and inserted into a list comprising previously coded or decoded block vectors or sample string vectors.

A10. The method of solution A9, wherein the list is an intra block copy (IBC) merge list, an IBC advanced motion vector prediction (AMVP) list, a sample string vector merge list, or a sample string vector AMVP list.

A11. The method of solution A8, wherein the sample string vector is stored and used as a prediction to code the block vector of the subsequent block or the sample string vector of the subsequent block.

A12. The method of solution A7, wherein the sample string vector is not stored and the associated samples, positions, blocks, or subblocks are marked as unavailable, non-intra coded, inter-coded, block vector unavailable, or sample string vector unavailable.

A13. The method of solution A7, wherein the sample string vector is not stored responsive to the shape of the first sample string forming a rectangle.

A14. The method of solution A7, wherein a height (H) of the current block, a width (W) of the current block, and the length (L) of the first sample string are non-negative integers.

A15. The method of solution A14, wherein the sample string vector is not stored responsive to (L % W) equaling zero, and wherein % is a modulo operator.

A16. The method of solution A14 or A15, wherein L is not equal to W.

A17. The method of solution A14, wherein the sample string vector is not stored responsive to L being equal to N×W, and wherein N is a non-negative integer.

A18. The method of solution A17, wherein N>0.

A19. The method of solution A17, wherein N>1.

A20. The method of solution A17, wherein N≤H.

A21. The method of solution A14, wherein the sample string vector is stored responsive to L being equal to N×W, and wherein N is a positive real number.

A22. The method of solution A21, wherein N=0.25, 0.5, 1.0, 1.5, or 2.0.

A23. The method of solution A7, wherein the sample string vector is not stored responsive to the position of the first sample string being at a specific position.

A24. The method of solution A7, wherein the sample string vector is stored responsive to the position of the first sample string being at a specific position.

A25. The method of solution A23 or A24, wherein the specific position is a bottom sample string of the current block.

A26. The method of solution A23 or A24, wherein the specific position is a top sample string of the current block.

A27. The method of solution A23 or A24, wherein the specific position is an N-th sample string from a top sample string of the current block, and wherein N is a positive integer.

A28. The method of solution A7, wherein the sample string vector is stored responsive to the shape of at least one sample string in the current block being non-rectangular.

A29. The method of any of solutions A7 to A28, wherein the current block is coded with a sample string coding mode in which the first sample string is reconstructed directly by copying a group of pixels in a current picture comprising the current block based on the sample string vector.

A30. A method of video processing, comprising determining, for a conversion between a video comprising a current block and a bitstream of the video, whether and how to insert a sample string vector associated with a first sample string of a reference block into a first list comprising previously coded or decoded block vectors or sample string vectors, and performing, based on the determining, the conversion, wherein the determining is based on a length, a position, or a shape of the first sample string, a size of the current block, or a size of the reference block.

A31. The method of solution A30, wherein the reference block is an adjacent neighboring block or a non-adjacent neighboring block.

A32. The method of solution A30 or A31, wherein the first list is an intra block copy (IBC) merge list, an IBC advanced motion vector prediction (AMVP) list, a sample string vector merge list, or a sample string vector AMVP list.

A33. The method of any of solutions A30 to A32, wherein the sample string vector is not inserted into the first list responsive to the shape of the first sample string forming a rectangle.

A34. The method of any of solutions A30 to A32, wherein a height (H) of the reference block, a width (W) of the reference block, and the length (L) of the first sample string are non-negative integers.

A35. The method of solution A34, wherein the sample string vector is not inserted into the first list responsive to L being a multiple of W.

A36. The method of solution A35, wherein (L % W) equals zero and % is a modulo operator.

A37. The method of solution A35 or A36, wherein L is not equal to W.

A38. The method of solution A35, L is equal to N×W and N is a non-negative integer.

A39. The method of solution A38, wherein N>0.

A40. The method of solution A38, wherein N>1.

A41. The method of solution A38, wherein N≤H.

A42. The method of solution A34, wherein the sample string vector is inserted into the first list responsive to L being equal to N×W, and wherein N is a positive real number.

A43. The method of solution A42, wherein N=0.25, 0.5, 1.0, 1.5, or 2.0.

A44. The method of any of solutions A30 to A32, wherein the sample string vector is not inserted into the first list responsive to the position of the first sample string being at a specific position.

A45. The method of any of solutions A30 to A32, wherein the sample string vector is inserted into the first list responsive to the position of the first sample string being at a specific position.

A46. The method of solution A44 or A45, wherein the specific position is a bottom sample string of the current block.

A47. The method of solution A44 or A45, wherein the specific position is a top sample string of the current block.

A48. The method of solution A44 or A45, wherein the specific position is an N-th sample string from a top sample string of the current block, and wherein N is a positive integer.

A49. The method of any of solutions A30 to A32, wherein the sample string vector is inserted into the first list responsive to the shape of at least one sample string in the reference block being non-rectangular.

A50. The method of any of solutions A1 to A49, wherein the conversion comprises decoding the video from the bitstream.

A51. The method of any of solutions A1 to A49, wherein the conversion comprises encoding the video into the bitstream.

A52. A method of storing a bitstream representing a video to a computer-readable recording medium, comprising generating the bitstream from the video according to a method described in any one or more of solutions A1 to A49, and storing the bitstream in the computer-readable recording medium.

A53. A video processing apparatus comprising a processor configured to implement a method recited in any one or more of solutions A1 to A52.

A54. A computer-readable medium having instructions stored thereon, the instructions, when executed, causing a processor to implement a method recited in one or more of solutions A1 to A52.

A55. A computer readable medium that stores the bitstream generated according to any one or more of solutions A1 to A52.

A56. A video processing apparatus for storing a bitstream, wherein the video processing apparatus is configured to implement a method recited in any one or more of solutions A1 to A52.

Another listing of solutions preferred by some embodiments is provided next.

P1. A video processing method, comprising constructing, for a conversion between a video block of a video and a coded representation of the video, a list of motion candidates by adding one or more block vectors corresponding to one or more non-adjacent blocks of the current video block according to a rule, and performing the conversion based on the list of motion candidates.

P2. The method of solution P1, wherein the list includes an intra block copy merge list.

P3. The method of any of solutions P1 to P2, wherein the list includes an advanced motion vector predictor list.

P4. The method of any of solutions P1 to P3, wherein the rule specifies an order in which the one or more non-adjacent blocks are checked for motion candidates based on positions of the one or more non-adjacent neighboring blocks relative to the current video block.

P5. The method of solution P4, wherein the order comprises first checking an above-left neighboring block, then an above-right neighboring block, then an below-left neighboring block, then an above neighboring block, and the left neighboring block of the current block.

P6. The method of solution P4, wherein the order comprises: left neighboring block, above neighboring block, above-left neighboring block, above-right neighboring block and below-left neighboring block of the current block.

P7. A method of video processing, comprising determining, for a conversion between a current video block of a video and a bitstream representation of the video, whether a condition under which block vectors of one or more block vectors of one or more non-adjacent neighboring blocks is met, wherein the condition depends on availability of a block vector from a history based block vector prediction list or availability of block vectors of an adjacent neighboring block; and performing the conversion according to the determining.

P8. The method of solution P7, wherein the condition for adding the block vectors of the one or more non-adjacent neighboring blocks is that all history based block vectors are inserted in the list.

P9. A video processing method, comprising determining, for a conversion between a current video block of a video and a coded representation of the video, whether a block vector in a history based block vector predictor (HBVP) list is classified into Nth class according to a rule that depends on a block size associated with the block vector or a size of the current video block; and performing the conversion based on the determining.

P10. The method of solution P9, wherein the rule specifies to classify the block vector in case that the block size associated with the block vector is a factor multiple of the size of the current video block.

P11. The method of solution P10, wherein the factor is equal to 1.

P12. A method of video processing, comprising determining, for a conversion between a current video block of a video and a coded representation of the video, a one-dimensional search range for determination of a block vector based on a rule based on a property of the current video block; and performing the conversion according to the determining.

P13. The method of solution P12, wherein the property comprises a coordinate of the current video block and wherein the property is sufficient to determine the search range.

P14. The method of solution P12, wherein the property comprises a size of the current video block.

P15. The method of any of solutions P1 to P14, wherein the performing the conversion comprises encoding the video to generate the coded representation.

P16. The method of any of solutions P1 to P14, wherein the performing the conversion comprises parsing and decoding the coded representation to generate the video.

P17. A video decoding apparatus comprising a processor configured to implement a method recited in one or more of solutions P1 to P16.

P18. A video encoding apparatus comprising a processor configured to implement a method recited in one or more of solutions P1 to P16.

P19. A computer program product having computer code stored thereon, the code, when executed by a processor, causes the processor to implement a method recited in any of solutions P1 to P16.

In the present document, the term "video processing" may refer to video encoding, video decoding, video compression or video decompression. For example, video compression algorithms may be applied during conversion from pixel representation of a video to a corresponding bitstream representation or vice versa. The bitstream representation (or simply, the bitstream) of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a video comprising a first block and a bitstream of the video, an availability of a block vector of one or more neighboring blocks of the first block for a prediction of a block vector of the first block according to a rule, wherein the neighboring blocks are allowed to include at least one non-adjacent neighboring block; and
   performing, based on the determining, the conversion,
   wherein the rule specifies a pre-defined order for checking the one or more neighboring blocks for the availability of the block vector;
   wherein the video further comprises a second block and the method further comprises:
      determining whether and how to store a sample string vector associated with a first sample string of the second block; and
      performing, based on the determining, the conversion,
      wherein the determining is based on at least one of a length, a position, or a shape of the first sample string;
      wherein the stored sample string vector is allowed to be inserted into a list which is an intra block copy (IBC) merge list, an IBC advanced motion vector prediction (AMVP) list, a sample string vector merge list, or a sample string vector AMVP list.

2. The method of claim 1, wherein the availability is based on coding information for each of the one or more neighboring blocks.

3. The method of claim 2, wherein the coding information includes whether each of the one or more neighboring blocks is coded with an intra block copy prediction mode or an intra string copy prediction mode.

4. The method of claim 1, wherein the stored sample string vector is used to code a subsequent block.

5. The method of claim 1, wherein the second block is coded with an intra string copy prediction mode in which the first sample string is reconstructed directly by copying a group of pixels in a current picture including the second block based on the sample string vector.

6. The method of claim 1, wherein the conversion comprises decoding the video from the bitstream.

7. The method of claim 1, wherein the conversion comprises encoding the video into the bitstream.

8. An apparatus for processing video data comprising a processor and a non-transitory memory with instructions thereon, wherein the instructions upon execution by the processor, cause the processor to:
   determine, for a conversion between a video comprising a first block and a bitstream of the video, an availability of a block vector of one or more neighboring blocks of the first block for a prediction of a block vector of the first block according to a rule, wherein the neighboring blocks are allowed to include at least one non-adjacent neighboring block; and
   perform, based on the determining, the conversion,
   wherein the rule specifies a pre-defined order for checking the one or more neighboring blocks for the availability of the block vector;
   wherein the video further comprises a second block and the instructions further cause the processor to:
      determine whether and how to store a sample string vector associated with a first sample string of the second block; and
      perform, based on the determining, the conversion,
      wherein the determining is based on at least one of a length, a position, or a shape of the first sample string;
      wherein the stored sample string vector is allowed to be inserted into a list which is an intra block copy (IBC) merge list, an IBC advanced motion vector prediction (AMVP) list, a sample string vector merge list, or a sample string vector AMVP list.

9. The apparatus of claim 8, wherein the availability is based on coding information for each of the one or more neighboring blocks.

10. The apparatus of claim 8, wherein the coding information includes whether each of the one or more neighboring blocks is coded with an intra block copy prediction mode or an intra string copy prediction mode.

11. The apparatus of claim 8, wherein the stored sample string vector is used to code a subsequent block;
wherein the second block is coded with an intra string copy prediction mode in which the first sample string is reconstructed directly by copying a group of pixels in a current picture including the second block based on the sample string vector.

12. A non-transitory computer-readable storage medium storing instructions that cause a processor to:
determine, for a conversion between a video comprising a first block and a bitstream of the video, an availability of a block vector of one or more neighboring blocks of the first block for a prediction of a block vector of the first block according to a rule, wherein the neighboring blocks are allowed to include at least one non-adjacent neighboring block; and
perform, based on the determining, the conversion,
wherein the rule specifies a pre-defined order for checking the one or more neighboring blocks for the availability of the block vector;
the video further comprises a second block and the instructions further cause the processor to:
determine whether and how to store a sample string vector associated with a first sample string of the second block; and
perform, based on the determining, the conversion,
wherein the determining is based on at least one of a length, a position, or a shape of the first sample string,
wherein the stored sample string vector is allowed to be inserted into a list which is an intra block copy (IBC) merge list, an IBC advanced motion vector prediction (AMVP) list, a sample string vector merge list, or a sample string vector AMVP list.

13. The non-transitory computer-readable storage medium of claim 12, wherein the availability is based on coding information for each of the one or more neighboring blocks, and
wherein the coding information includes whether each of the one or more neighboring blocks is coded with an intra block copy prediction mode or an intra string copy prediction mode.

14. The non-transitory computer-readable storage medium of claim 12,
wherein the stored sample string vector is used to code a subsequent block, and
wherein the second block is coded with an intra string copy prediction mode in which the first sample string is reconstructed directly by copying a group of pixels in a current picture including the second block based on the sample string vector.

15. A non-transitory computer-readable recording medium storing a bitstream of a video which is generated by a method performed by a video processing apparatus, wherein the method comprises:
determining an availability of a block vector of one or more neighboring blocks of a first block of the video for a prediction of a block vector of the first block according to a rule, wherein the neighboring blocks are allowed to include at least one non-adjacent neighboring block; and
generating, based on the determining, the bitstream,
wherein the rule specifies a pre-defined order for checking the one or more neighboring blocks for the availability of the block vector;
wherein the video further comprises a second block and the method further comprises:
determining whether and how to store a sample string vector associated with a first sample string of the second block; and
generating, based on the determining, the bitstream,
wherein the determining is based on at least one of a length, a position, or a shape of the first sample string;
wherein the stored sample string vector is allowed to be inserted into a list which is an intra block copy (IBC) merge list, an IBC advanced motion vector prediction (AMVP) list, a sample string vector merge list, or a sample string vector AMVP list.

16. The non-transitory computer-readable recording medium of claim 15, wherein the availability is based on coding information for each of the one or more neighboring blocks, and
wherein the coding information includes whether each of the one or more neighboring blocks is coded with an intra block copy prediction mode or an intra string copy prediction mode.

17. The non-transitory computer-readable recording medium of claim 15,
wherein the stored sample string vector is used to code a subsequent block, and
wherein the second block is coded with an intra string copy prediction mode in which the first sample string is reconstructed directly by copying a group of pixels in a current picture including the second block based on the sample string vector.

* * * * *